United States Patent
Tamse et al.

(10) Patent No.: US 11,943,469 B2
(45) Date of Patent: *Mar. 26, 2024

(54) VIDEO DECODING METHOD AND DEVICE, AND VIDEO ENCODING METHOD AND DEVICE

(71) Applicant: SAMSUNG ELECTRONICS CO., LTD., Suwon-si (KR)

(72) Inventors: Anish Tamse, Suwon-si (KR); Minwoo Park, Suwon-si (KR); Gahyun Ryu, Suwon-si (KR); Minsoo Park, Suwon-si (KR); Seungsoo Jeong, Suwon-si (KR); Kiho Choi, Suwon-si (KR); Narae Choi, Suwon-si (KR); Woongil Choi, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,515

(22) Filed: Jul. 8, 2022

(65) Prior Publication Data
US 2022/0353526 A1 Nov. 3, 2022

Related U.S. Application Data

(63) Continuation of application No. 17/311,209, filed as application No. PCT/KR2019/017231 on Dec. 6, 2019, now Pat. No. 11,425,416.

(Continued)

(51) Int. Cl.
*H04N 19/119* (2014.01)
*H04N 19/139* (2014.01)
(Continued)

(52) U.S. Cl.
CPC ........... *H04N 19/52* (2014.11); *H04N 19/119* (2014.11); *H04N 19/139* (2014.11);
(Continued)

(58) Field of Classification Search
CPC .... H04N 19/52; H04N 19/159; H04N 19/119; H04N 19/186; H04N 19/527; H04N 19/139; H04N 19/176
See application file for complete search history.

(56) References Cited

U.S. PATENT DOCUMENTS 10,455,228 B2  10/2019  Seregin et al.
11,197,007 B2 * 12/2021  Zhang ............... H04N 19/109
(Continued)

FOREIGN PATENT DOCUMENTS

CL  2020003275 A1  5/2021
CL  2021000527 A1  8/2021
(Continued)

OTHER PUBLICATIONS

Communication dated Sep. 28, 2022 issue by the Chilean Patent Office in counterpart Chilean Patent Application No. 1465-2021.
(Continued)

*Primary Examiner* — Tsion B Owens
(74) *Attorney, Agent, or Firm* — Sughrue Mion, PLLC

(57) ABSTRACT

A video decoding method and device for determining whether a prediction mode of a current block is an affine mode; splitting, when the prediction mode of the current block is the affine mode, a luma block of the current block into a plurality of sub luma blocks having a square shape based on a predefined sub block size; determining a mean luma motion vector for four neighboring sub luma blocks among the plurality of sub luma blocks, by using a motion vector of an upper-left sub luma block of the four sub luma blocks and a motion vector of a lower-right sub luma block
(Continued)

of the four sub luma blocks; determining the mean luma motion vector to be a motion vector of a current sub chroma block corresponding to the four sub luma blocks; and performing prediction on the current sub chroma block by using the determined motion vector, in a video encoding and decoding process are suggested.

3 Claims, 29 Drawing Sheets

Related U.S. Application Data

(60) Provisional application No. 62/783,653, filed on Dec. 21, 2018, provisional application No. 62/776,589, filed on Dec. 7, 2018.

(51) Int. Cl.
*H04N 19/159* (2014.01)
*H04N 19/176* (2014.01)
*H04N 19/186* (2014.01)
*H04N 19/52* (2014.01)
*H04N 19/527* (2014.01)

(52) U.S. Cl.
CPC ......... *H04N 19/159* (2014.11); *H04N 19/176* (2014.11); *H04N 19/186* (2014.11); *H04N 19/527* (2014.11)

(56) References Cited

U.S. PATENT DOCUMENTS

| | | | |
|---|---|---|---|
| 2018/0192069 A1 | 7/2018 | Chen et al. | |
| 2019/0124332 A1 | 4/2019 | Lim et al. | |
| 2019/0335197 A1 | 10/2019 | Kang et al. | |
| 2020/0221087 A1 | 7/2020 | Tamse et al. | |
| 2021/0037240 A1 | 2/2021 | Zhang et al. | |
| 2021/0152843 A1 | 5/2021 | Lee et al. | |
| 2021/0337196 A1* | 10/2021 | Lee | H04N 19/52 |
| 2021/0360227 A1 | 11/2021 | Zhao et al. | |
| 2022/0070468 A1* | 3/2022 | Lee | H04N 19/52 |

FOREIGN PATENT DOCUMENTS

| | | |
|---|---|---|
| CL | 2021000671 A1 | 9/2021 |
| CO | NC2017/0001556 A2 | 5/2017 |
| KR | 1020180057564 A | 5/2018 |
| KR | 1020180122361 A | 11/2018 |
| KR | 1020180128955 A | 12/2018 |
| WO | 2018070152 A1 | 4/2018 |
| WO | 2018182310 A1 | 10/2018 |
| WO | 2019066574 A1 | 4/2019 |
| WO | 2020022853 A1 | 1/2020 |
| WO | 2020060236 A1 | 3/2020 |
| WO | 2020073969 A1 | 4/2020 |
| WO | 2020076047 A1 | 4/2020 |
| WO | WO-2020073969 A1 * | 4/2020 |

OTHER PUBLICATIONS

Communication dated Sep. 23, 2022 issued by the European Patent Office in counterpart European Patent Application No. 19893600.7.
J. Chen et al., "Algorithm description for Versatile Video Coding and Test Model 3 (VTM 3)", 12th meeting Joint Video Experts Team (JVET) of ITU-T SG 16 WP 3 and ISO/IEC JTC 1/SC 29/WG 11, JVET-L1002-v1, XP030215995, Oct. 2018, (37 pages total).
H. Yang et al., "Description of CE4: Inter prediction and motion vector coding", 10th meeting Joint Video Experts Team (JVET) of ITU-T SG 16 WP 3 and ISO/IEC JTC 1/SC 29/WG 11, JVET-J1024r2, XP030151319, Apr. 2018, (46 pages total).
Communication dated Jun. 10, 2022 issued by the Chilean Patent Office in application No. 202101465.
International Search Report (PCT/ISA/210) dated Mar. 12, 2020 issued by the International Searching Authority in International Application No. PCT/KR2019/017231.
Indian Office Action issued from the Indian Patent Office dated Jan. 16, 2023 to IN Patent Application No. 202127024351.
Communication issued on Dec. 28, 2023 by the Colombian Patent Office for Colombian Patent Application No. NC2021/0007877.

\* cited by examiner

FIG. 13

| DEPTH \ BLOCK SHAPE | 0: SQUARE | 1: NS_VER | 2: NS_HOR |
|---|---|---|---|
| DEPTH D | ☐ 1300 | ☐ 1310 | ☐ 1320 |
| DEPTH D+1 | ☐ 1302 | ☐ 1312 | ☐ 1322 |
| DEPTH D+2 | ☐ 1304 | ☐ 1314 | ☐ 1324 |
| ... | ... | ... | ... |

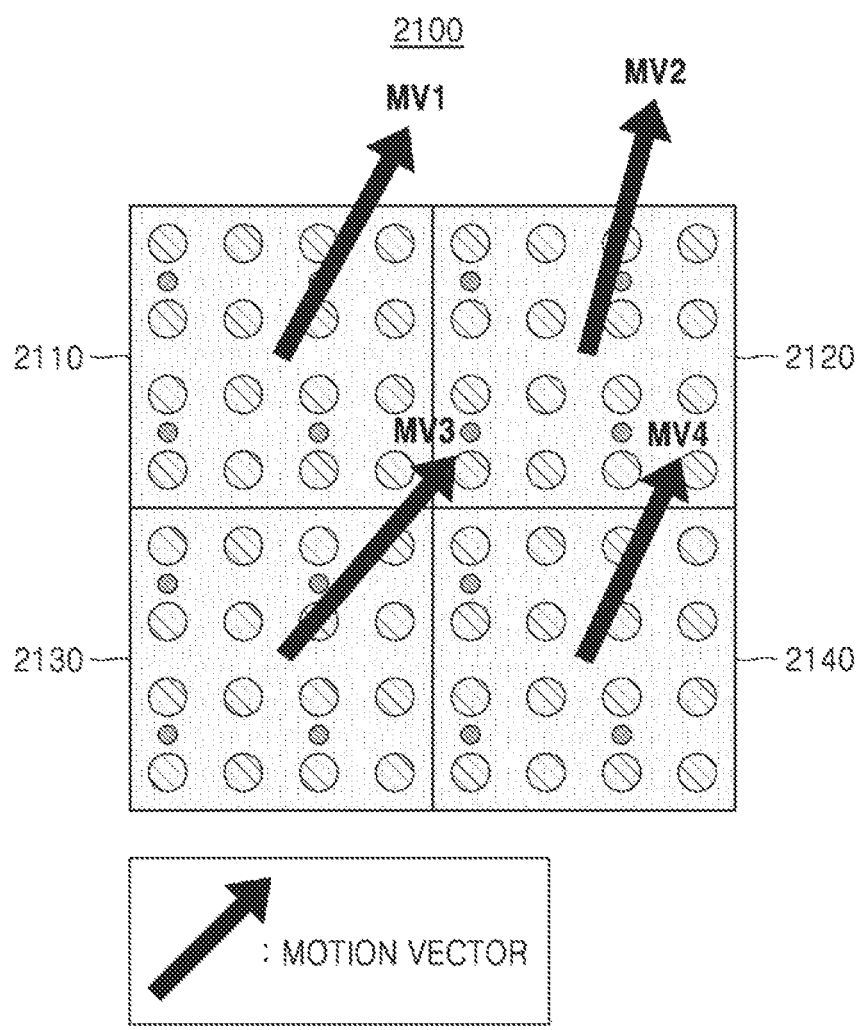

VIDEO DECODING METHOD AND DEVICE, AND VIDEO ENCODING METHOD AND DEVICE

CROSS-REFERENCE TO RELATED APPLICATIONS

This application is a continuation application of U.S. patent application Ser. No. 17/311,209, filed on Jun. 4, 2021, which is a National Stage of International Application No. PCT/KR2019/017231, filed Dec. 6, 2019, and claims the benefits of U.S. Patent Application No. 62/783,653, filed on Dec. 21, 2018, and U.S. Patent Application No. 62/776,589, field on Dec. 7, 2018, in the United States Patent and Trademark Office, the disclosures of which are incorporated herein in their entirety by reference.

TECHNICAL FIELD

The disclosure relates to a video decoding method and a video decoding device, and more particularly, to an image encoding method and device and an image decoding method and device, for determining whether a prediction mode of a current block is an affine mode, splitting, when the prediction mode of the current block is the affine mode, a luma block of the current block into a plurality of sub luma blocks having a square shape based on a predefined sub block size, determining a mean luma motion vector for four neighboring sub luma blocks among the plurality of sub luma blocks by using a motion vector of an upper-left sub luma block of the four sub luma blocks and a motion vector of a lower-right sub luma block of the four sub luma blocks, determining the mean luma motion vector to be a motion vector of a current sub chroma block corresponding to the four sub luma blocks, and performing prediction on the current sub chroma block by using the determined motion vector.

BACKGROUND ART

Image data is encoded by a codec according to a predefined data compression standard, for example, a moving picture expert group (MPEG) standard, and then stored in a form of a bitstream in a recording medium or transmitted through a communication channel.

With the development and propagation of hardware capable of reproducing and storing high-resolution or high-definition image content, a need for a codec for effectively encoding or decoding high-resolution or high-definition image content is increasing. Encoded image data may be decoded and reproduced. Recently, methods for effectively compressing such high-resolution or high-definition image content are performed. For example, image compression technology is proposed to be effectively implemented through a process of segmenting an image to be encoded by an arbitrary method or rendering data.

As one of techniques for rendering data, a method of performing chroma prediction based on an intra prediction mode of a luma block corresponding to a chroma block in chroma prediction is generally used.

DESCRIPTION OF EMBODIMENTS

Technical Problem

A method and device for determining whether a prediction mode of a current block is an affine mode; splitting, when the prediction mode of the current block is the affine mode, a luma block of the current block into a plurality of sub luma blocks having a square shape based on a predefined sub block size; determining a mean luma motion vector for four neighboring sub luma blocks among the plurality of sub luma blocks, by using a motion vector of an upper-left sub luma block of the four sub luma blocks and a motion vector of a lower-right sub luma block of the four sub luma blocks; determining the mean luma motion vector to be a motion vector of a current sub chroma block corresponding to the four sub luma blocks; and performing prediction on the current sub chroma block by using the determined motion vector, in a video encoding and decoding process are suggested.

Solution to Problem

To overcome the above-described technical problem, a video decoding method, proposed in the disclosure, includes: determining whether a prediction mode of a current block is an affine mode; splitting, when the prediction mode of the current block is the affine mode, a luma block of the current block into a plurality of sub luma blocks having a square shape based on a predefined sub block size; determining a mean luma motion vector for four neighboring sub luma blocks among the plurality of sub luma blocks, by using a motion vector of an upper-left sub luma block of the four sub luma blocks and a motion vector of a lower-right sub luma block of the four sub luma blocks; determining the mean luma motion vector to be a motion vector of a current sub chroma block corresponding to the four sub luma blocks; and performing prediction on the current sub chroma block by using the determined motion vector.

To overcome the above-described technical problem, a video decoding device, proposed in the disclosure, includes: a memory; and at least one processor connected to the memory, and configured to execute one or more instructions to determine whether a prediction mode of a current block is an affine mode, split, when the prediction mode of the current block is the affine mode, a luma block of the current block into a plurality of sub luma blocks having a square shape based on a predefined sub block size, determine a mean luma motion vector for four neighboring sub luma blocks among the plurality of sub luma blocks, by using a motion vector of an upper-left sub luma block of the four sub luma blocks and a motion vector of a lower-right sub luma block of the four sub luma blocks, determine the mean luma motion vector to be a motion vector of a current sub chroma block corresponding to the four sub luma blocks, and perform prediction on the current sub chroma block by using the determined motion vector.

To overcome the above-described technical problem, a video encoding method, proposed in the disclosure, includes: determining whether a prediction mode of a current block is an affine mode; splitting, when the prediction mode of the current block is the affine mode, a luma block of the current block into a plurality of sub luma blocks having a square shape based on a predefined sub block size; determining a mean luma motion vector for four neighboring sub luma blocks among the plurality of sub luma blocks, by using a motion vector of an upper-left sub luma block of the four sub luma blocks and a motion vector of a lower-right sub luma block of the four sub luma blocks; determining the mean luma motion vector to be a motion vector of a current sub chroma block corresponding to the four sub luma blocks; and performing prediction on the current sub chroma block by using the determined motion vector.

To overcome the above-described technical problem, a video encoding device, proposed in the disclosure, includes: a memory; and at least one processor connected to the memory, and configured to execute one or more instructions to determine whether a prediction mode of a current block is an affine mode, split, when the prediction mode of the current block is the affine mode, a luma block of the current block into a plurality of sub luma blocks having a square shape based on a predefined sub block size, determine a mean luma motion vector for four neighboring sub luma blocks among the plurality of sub luma blocks, by using a motion vector of an upper-left sub luma block of the four sub luma blocks and a motion vector of a lower-right sub luma block of the four sub luma blocks, determine the mean luma motion vector to be a motion vector of a current sub chroma block corresponding to the four sub luma blocks, and perform prediction on the current sub chroma block by using the determined motion vector.

Advantageous Effects of Disclosure

By determining whether a prediction mode of a current block is an affine mode; splitting, when the prediction mode of the current block is the affine mode, a luma block of the current block into a plurality of sub luma blocks having a square shape based on a predefined sub block size; determining a mean luma motion vector for four neighboring sub luma blocks among the plurality of sub luma blocks, by using a motion vector of an upper-left sub luma block of the four sub luma blocks and a motion vector of a lower-right sub luma block of the four sub luma blocks; determining the mean luma motion vector to be a motion vector of a current sub chroma block corresponding to the four sub luma blocks; and performing prediction on the current sub chroma block by using the determined motion vector, in a video encoding and decoding process, prediction of a chroma block corresponding to a luma block of a current block to which the affine mode is applied may be efficiently improved.

BRIEF DESCRIPTION OF DRAWINGS

FIG. 13 illustrates a process of determining a depth of a coding unit as a shape and size of the coding unit change, when the coding unit is recursively split such that a plurality of coding units are determined, according to an embodiment.

FIG. 21B is a view for describing a method of performing prediction on a sub chroma block corresponding to four sub luma blocks by using motion vectors of the four sub luma blocks.

BEST MODE

Figure 1:
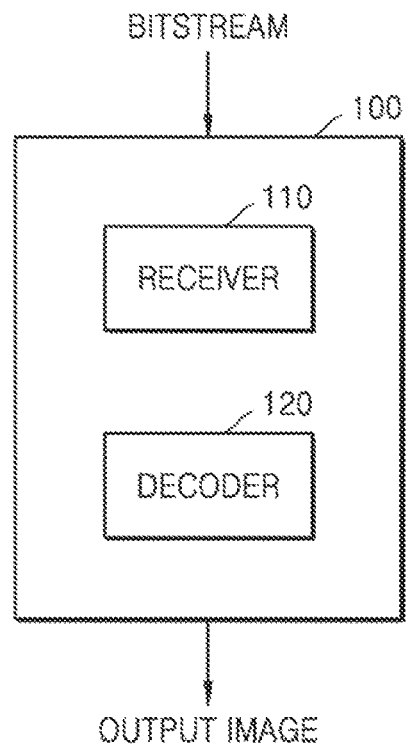
FIG. 1 illustrates a schematic block diagram of an image decoding device according to an embodiment.

A video decoding method according to an embodiment proposed in the disclosure includes: determining whether a prediction mode of a current block is an affine mode; splitting, when the prediction mode of the current block is the affine mode, a luma block of the current block into a plurality of sub luma blocks having a square shape based on a predefined sub block size; determining a mean luma motion vector for four neighboring sub luma blocks among the plurality of sub luma blocks, by using a motion vector of an upper-left sub luma block of the four sub luma blocks and a motion vector of a lower-right sub luma block of the four sub luma blocks; determining the mean luma motion vector to be a motion vector of a current sub chroma block corresponding to the four sub luma blocks; and performing prediction on the current sub chroma block by using the determined motion vector.

According to an embodiment, the motion vector of the current sub chroma block may be a mean value of the motion vector of the upper-left sub luma block and the motion vector of the lower-right sub luma block.

According to an embodiment, a chroma format of a current chroma image including the current sub chroma block may be 4:2:0.

According to an embodiment, the predefined sub block size may be 4×4.

According to an embodiment, when the predefined sub block size is 4×4, a size of the current sub chroma block may be 4×4.

A video encoding method according to an embodiment proposed in the disclosure includes: determining whether a prediction mode of a current block is an affine mode; splitting, when the prediction mode of the current block is the affine mode, a luma block of the current block into a plurality of sub luma blocks having a square shape based on a predefined sub block size; determining a mean luma motion vector for four neighboring sub luma blocks among the plurality of sub luma blocks, by using a motion vector of an upper-left sub luma block of the four sub luma blocks and a motion vector of a lower-right sub luma block of the four sub luma blocks; determining the mean luma motion vector to be a motion vector of a current sub chroma block corresponding to the four sub luma blocks; and performing prediction on the current sub chroma block by using the determined motion vector.

According to an embodiment, the motion vector of the current sub chroma block may be a mean value of the motion vector of the upper-left sub luma block and the motion vector of the lower-right sub luma block.

According to an embodiment, a chroma format of a current chroma image including the current sub chroma block may be 4:2:0.

According to an embodiment, the predefined sub block size may be 4×4.

According to an embodiment, when the predefined sub block size is 4×4, a size of the current sub chroma block may be 4×4.

A video decoding device according to an embodiment proposed in the disclosure includes: a memory; and at least one processor connected to the memory, and configured to execute one or more instructions to determine whether a prediction mode of a current block is an affine mode, split, when the prediction mode of the current block is the affine mode, a luma block of the current block into a plurality of sub luma blocks having a square shape based on a predefined sub block size, determine a mean luma motion vector for four neighboring sub luma blocks among the plurality of sub luma blocks, by using a motion vector of an upper-left sub luma block of the four sub luma blocks and a motion vector of a lower-right sub luma block of the four sub luma blocks, determine the mean luma motion vector to be a motion vector of a current sub chroma block corresponding to the four sub luma blocks, and perform prediction on the current sub chroma block by using the determined motion vector.

According to an embodiment, the motion vector of the current sub chroma block may be a mean value of the motion vector of the upper-left sub luma block and the motion vector of the lower-right sub luma block.

According to an embodiment, a chroma format of a current chroma image including the current sub chroma block may be 4:2:0.

According to an embodiment, the predefined sub block size may be 4×4.

According to an embodiment, when the predefined sub block size is 4×4, a size of the current sub chroma block may be 4×4.

MODE OF DISCLOSURE

Advantages and features of disclosed embodiments and a method for achieving them will be made clear with reference to the accompanying drawings, in which the embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art.

Terms used in this specification will be briefly described, and the disclosed embodiments will be described in detail.

Although general terms being widely used in this specification were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It is to be understood that the singular forms "a," "an," and "the" include plural referents unless the context clearly dictates otherwise.

Also, it will be understood that when a certain part "includes" a certain component, the part does not exclude another component but can further include another component, unless the context clearly dictates otherwise.

As used herein, the terms "portion", "module", or "unit" refers to a software or hardware component that performs predetermined functions. However, the term "portion", "module" or "unit" is not limited to software or hardware. The "portion", "module", or "unit" may be configured in an addressable storage medium, or may be configured to run on at least one processor. Therefore, as an example, the "portion", "module", or "unit" includes: components such as software components, object-oriented software components, class components, and task components; processors, functions, attributes, procedures, sub-routines, segments of program codes, drivers, firmware, microcodes, circuits, data, databases, data structures, tables, arrays, and variables. Functions provided in the components and "portions", "modules" or "units" may be combined into a smaller number of components and "portions", "modules" and "units", or sub-divided into additional components and "portions", "modules" or "units".

In an embodiment of the disclosure, the "portion", "module", or "unit" may be implemented as a processor and a memory. The term "processor" should be interpreted in a broad sense to include a general-purpose processor, a central processing unit (CPU), a microprocessor, a digital signal processor (DSP), a controller, a microcontroller, a state machine, etc. In some embodiments, the "processor" may indicate an application-specific integrated circuit (ASIC), a programmable logic device (PLD), a field programmable gate array (FPGA), etc. The term "processor" may indicate a combination of processing devices, such as, for example, a combination of a DSP and a microprocessor, a combination of a plurality of microprocessors, a combination of one or more microprocessors coupled to a DSP core, or a combination of other arbitrary similar components.

The term "memory" should be interpreted in a broad sense to include an arbitrary electronic component capable of storing electronic information. The term "memory" may indicate various types of processor-readable media, such as random access memory (RAM), read only memory (ROM), non-volatile RAM (NVRAM), programmable ROM (PROM), erasable programmable ROM (EPROM), electrically erasable PROM (EEPROM), flash memory, a magnetic or optical data storage device, registers, etc. When a processor can read information from a memory and/or write information in the memory, the memory can be considered to electronically communicate with the processor. A memory integrated into a process electronically communicates with the processor.

Hereinafter, an "image" may indicate a still image of a video or may indicate a dynamic image such as a moving image, that is, the video itself.

Hereinafter, a "sample" denotes data assigned to a sampling location of an image, i.e., data to be processed. For example, pixel values of an image in a spatial domain and transform coefficients on a transformation region may be samples. A unit including at least one such sample may be defined as a block.

Also, in the present specification, a "current block" may denote a block of a largest coding unit, a coding unit, a prediction unit, or a transform unit of a current image to be encoded or decoded.

The disclosure will now be described more fully with reference to the accompanying drawings for one of ordinary skill in the art to be able to perform the disclosure without any difficulty. Also, portions irrelevant to the descriptions of the disclosure will be omitted in the drawings for clear descriptions of the disclosure.

Hereinafter, an image encoding device, an image decoding device, an image encoding method, and an image decoding method, according to an embodiment, will be described with reference to FIGS. 1 to 16. A method of determining a data unit of an image, according to an embodiment, will be described with reference to FIGS. 3 to 16, a video encoding/decoding method of determining whether a prediction mode of a current block is an affine mode, splitting, when the prediction mode of the current block is the affine mode, a luma block of the current block into a plurality of sub luma blocks having a square shape based on a predefined sub block size, determining a mean luma motion vector for four neighboring sub luma blocks among the plurality of sub luma blocks by using a motion vector of an upper-left sub luma block of the four sub luma blocks and a motion vector of a lower-right sub luma block of the four sub luma blocks, determining the mean luma motion vector to be a motion vector of a current sub chroma block corresponding to the four sub luma blocks, and performing prediction on the current sub chroma block by using the determined motion vector, according to an embodiment, will be described with reference to FIGS. 17 to 21, a method of deriving a motion vector to be applied to a sample of a current block in an affine mode will be described with reference to FIGS. 22 to 29, a method of deriving parameters of an affine mode in a coding unit bordering on an upper boundary of a largest coding unit will be described with reference to FIG. 23, a method of deriving parameters of an affine mode from neighboring blocks will be described with reference to FIG. 24, a method of determining temporal motion vector candidates for sub block units will be described with reference to FIG. 25, affine inherited candidates and affine constructed candidates in an affine merge candidate list will be described with reference to FIGS. 26A and 26B, a method of determining resolutions for three control point motion vectors (CPMVs) of an affine mode will be described with reference to FIG. 27, and a method of limiting a reference area for a memory bandwidth reduction in an affine mode will be described with reference to FIG. 28.

Hereinafter, a method and device for adaptively selecting a context model, based on various shapes of coding units, according to an embodiment of the disclosure, will be described with reference to FIGS. 1 and 2.

FIG. 1 illustrates a schematic block diagram of an image decoding device according to an embodiment.

The image decoding device 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding device 2200 described below. Also, the bitstream may be transmitted from the image encoding device 2200. The image encoding device 2200 and the image decoding device 100 may be connected by wire or wirelessly, and the receiver 110 may receive the bitstream by wire or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding device 100 will be described in detail with reference to FIG. 2.

Figure 2:
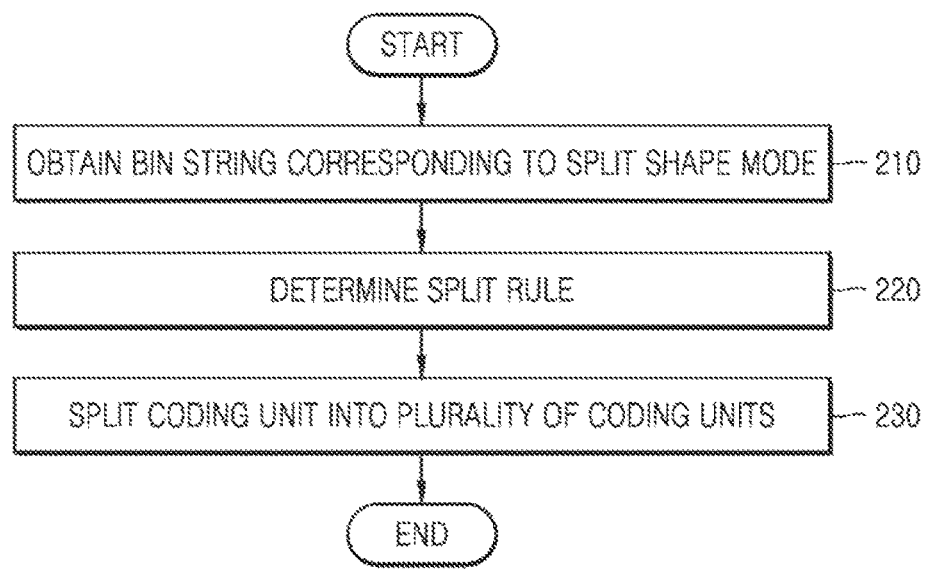
FIG. 2 illustrates a flowchart of an image decoding method according to an embodiment.

FIG. 2 illustrates a flowchart of an image decoding method according to an embodiment.

According to an embodiment of the disclosure, the receiver 110 receives a bitstream.

The image decoding device 100 obtains, from a bitstream, a bin string corresponding to a split shape mode of a coding unit (operation 210). The image decoding device 100 determines a split rule of coding units (operation 220). Also, the image decoding device 100 splits the coding unit into a plurality of coding units, based on at least one of the bin string corresponding to the split shape mode and the split rule (operation 230). The image decoding device 100 may determine an allowable first range of a size of the coding unit, according to a ratio of the width and the height of the coding unit, so as to determine the split rule. The image decoding device 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a preset size including a preset number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding device 100 may obtain, from the bitstream, the split shape mode information from one bin string. A form of the bitstream received by the image decoding device 100 may include fixed length binary code, unary code, truncated unary code, predetermined binary code, or the like. The bin string is information in a binary number. The bin string may include at least one bit. The image decoding device 100 may obtain the split shape mode information corresponding to the bin string, based on the split rule. The image decoding device 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be same as or smaller than the coding unit. Also, one or more transform blocks for transformation may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and a neighboring block of the disclosure may indicate one of the largest coding unit, the coding unit, the prediction block, and the transform block. Also, the current block of the current coding unit is a block that is currently being decoded or encoded or a block that is currently being split. The neighboring block may be a block reconstructed before the current block. The neighboring block may be adjacent to the current block spatially or temporally. The neighboring block may be located at one of the lower left, left, upper left, top, upper right, right, lower right of the current block.

Figure 3:
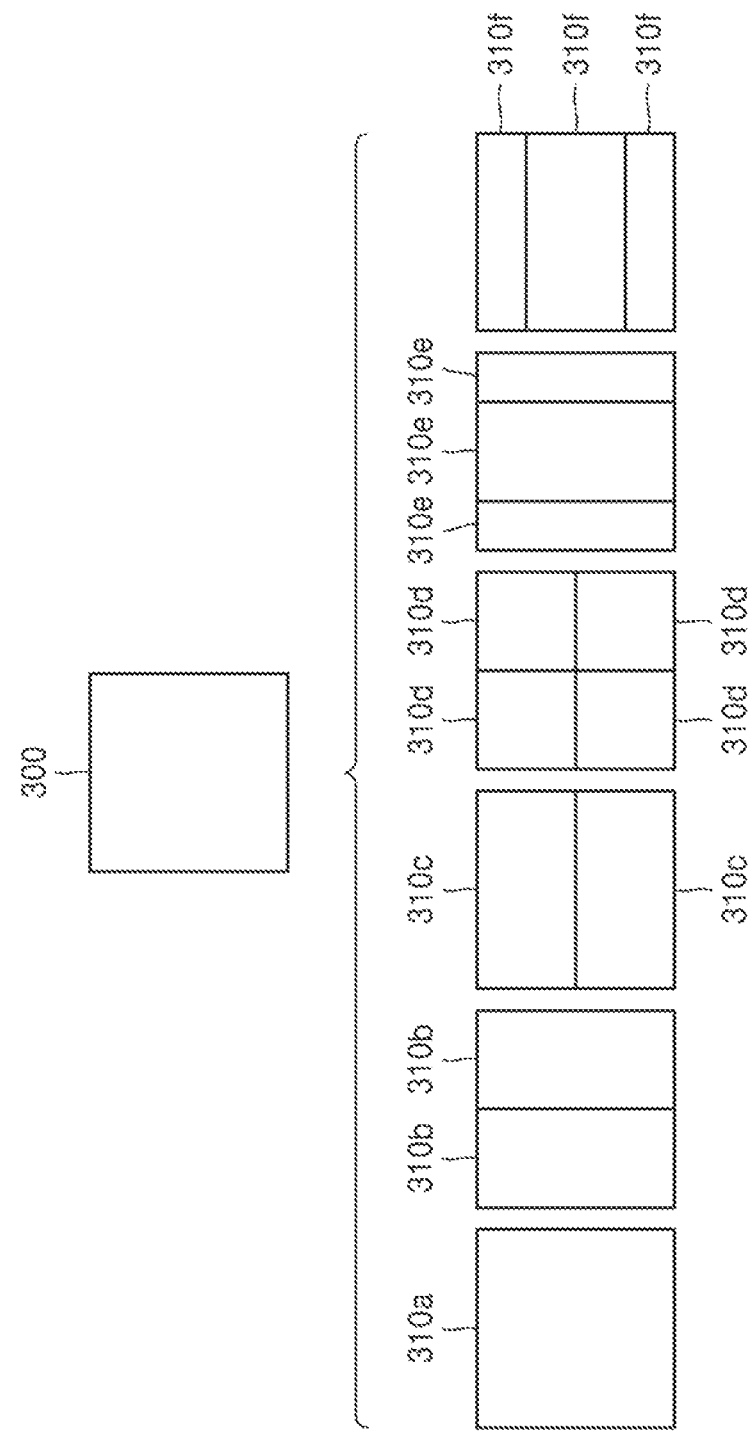
FIG. 3 illustrates a process, performed by an image decoding device, of determining at least one coding unit by splitting a current coding unit, according to an embodiment.

FIG. 3 illustrates a process, performed by an image decoding device, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding device 100 may determine the block shape information of the coding unit as a square. The image decoding device 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding device 100 may determine the block shape information of the coding unit as a non-square shape. When the shape of the coding unit is non-square, the image decoding device 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding device 100 may determine whether the coding unit is in a horizontal direction or a vertical direction, based on the length of the width and the length of the height of the coding unit. Also, the image decoding device 100 may determine the size of the coding unit, based on at least one of the length of the width, the length of the height, or the area of the coding unit.

According to an embodiment, the image decoding device 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding device 100.

The image decoding device 100 may obtain the split shape mode information from a bitstream. However, an embodiment is not limited thereto, and the image decoding device 100 and the image encoding device 2200 may determine pre-agreed split shape mode information, based on the block shape information. The image decoding device 100 may determine the pre-agreed split shape mode information with respect to a largest coding unit or a smallest coding unit. For example, the image decoding device 100 may determine split shape mode information with respect to the largest coding unit to be a quad split. Also, the image decoding device 100 may determine split shape mode information regarding the smallest coding unit to be "not to perform splitting". In particular, the image decoding device 100 may determine the size of the largest coding unit to be 256×256. The image decoding device 100 may determine the pre-agreed split shape mode information to be a quad split. The quad split is a split shape mode in which the width and the height of the coding unit are both bisected. The image decoding device 100 may obtain a coding unit of a 128×128 size from the largest coding unit of a 256×256 size, based on the split shape mode information. Also, the image decoding device 100 may determine the size of the smallest coding unit to be 4×4. The image decoding device 100 may obtain split shape mode information indicating "not to perform splitting" with respect to the smallest coding unit.

According to an embodiment, the image decoding device 100 may use the block shape information indicating that the current coding unit has a square shape. For example, the image decoding device 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a preset splitting method.

Referring to FIG. 3, according to an embodiment, the image decoding device 100 may determine two coding units 310b obtained by splitting the current coding unit 300 in a vertical direction, based on the split shape mode information indicating to perform splitting in a vertical direction. The image decoding device 100 may determine two coding units 310c obtained by splitting the current coding unit 300 in a horizontal direction, based on the split shape mode information indicating to perform splitting in a horizontal direction. The image decoding device 100 may determine four coding units 310d obtained by splitting the current coding unit 300 in vertical and horizontal directions, based on the split shape mode information indicating to perform splitting in vertical and horizontal directions. According to an embodiment, the image decoding device 100 may determine three coding units 310e obtained by splitting the current coding unit 300 in a vertical direction, based on the split shape mode information indicating to perform ternary splitting in a vertical direction. The image decoding device 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Preset splitting methods of splitting the square coding unit will be described in detail below in relation to various embodiments.

Figure 4:
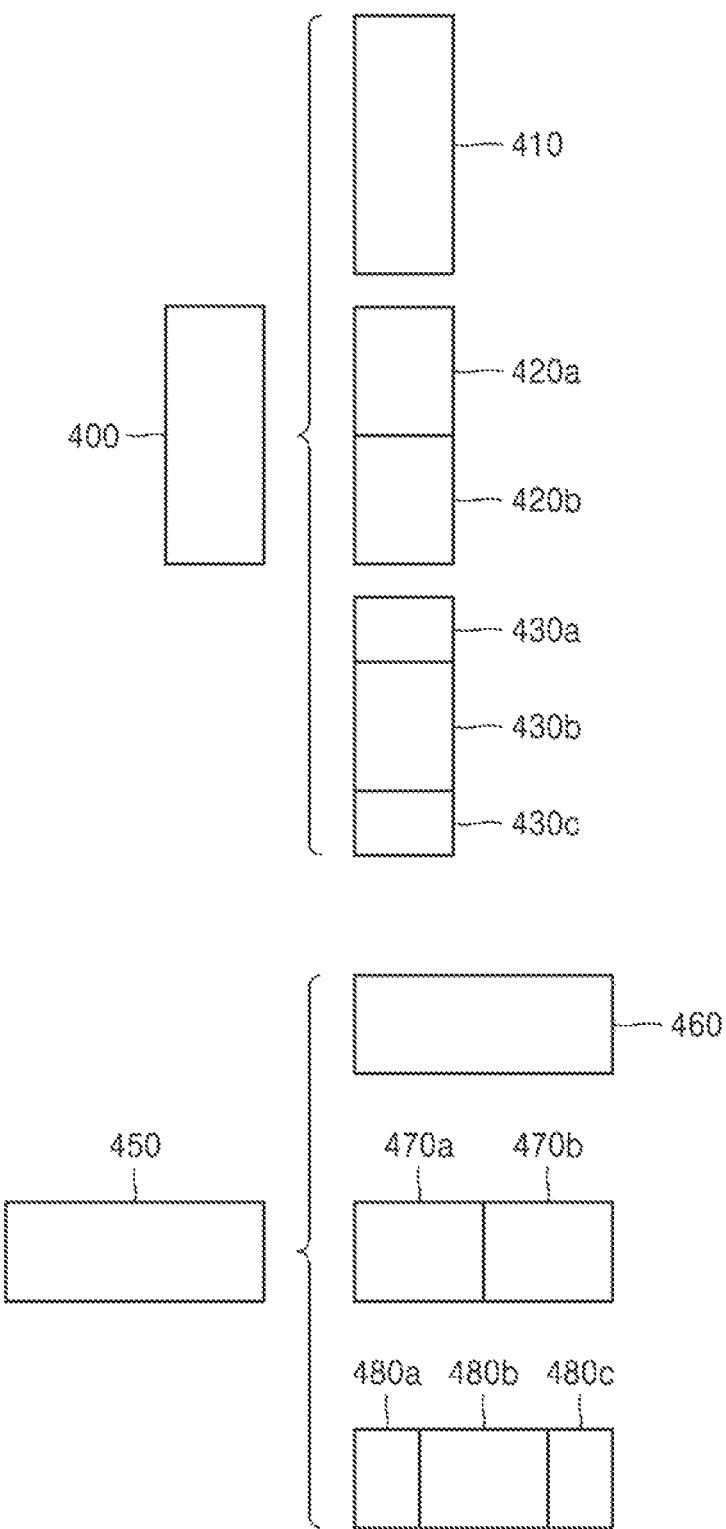
FIG. 4 illustrates a process, performed by an image decoding device, of determining at least one coding unit by splitting a non-square coding unit, according to an embodiment.

FIG. 4 illustrates a process, performed by an image decoding device, of determining at least one coding unit by splitting a non-square coding unit, according to an embodiment.

According to an embodiment, the image decoding device 100 may use block shape information indicating that a current coding unit has a non-square shape. The image decoding device 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding device 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a preset splitting method. Preset splitting methods of splitting a non-square coding unit will be described in detail below in relation to various embodiments.

According to an embodiment, the image decoding device 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding device 100 may determine two coding units 420a and 420b, or 470a and 470b included in the current coding unit 400 or 450, by splitting the current coding unit 400 or 450 based on the split shape mode information.

According to an embodiment, when the image decoding device 100 splits the non-square current coding unit 400 or 450 based on the split shape mode information, the image decoding device 100 may consider the location of a long side of the non-square current coding unit 400 or 450 to split a current coding unit. For example, the image decoding device 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding device 100 may determine an odd number of coding units included in the current coding unit 400 or 450. For example, when the split shape mode information indicates to split the current coding unit 400 or 450 into three coding units, the image decoding device 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding device 100 may determine to split a current coding unit into the odd number of blocks, based on the split shape mode information. Also, the image decoding device 100 may determine a split direction of the current coding unit 400 or 450, based on the block shape information of the current coding unit 400 or 450. For example, when the current coding unit 400 is in the vertical direction, the image decoding device 100 may determine the coding units 430a to 430c by splitting the current coding unit 400 in the horizontal direction. Also, when the current coding unit 450 is in the horizontal direction, the image decoding device 100 may determine the coding units 480a to 480c by splitting the current coding unit 450 in the vertical direction.

According to an embodiment, the image decoding device 100 may determine the odd number of coding units included in the current coding unit 400 or 450, and not all the determined coding units may have the same size. For example, a preset coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding device 100 may determine the odd number of coding units included in the current coding unit 400 or 450, and moreover, may put a preset restriction on at least one coding unit from among the odd number of coding units generated by splitting the current coding unit 400 or 450. Referring to FIG. 4, the image decoding device 100 may set a decoding process regarding the coding unit 430b or 480b located at the center among the three coding units 430a, 430b, and 430c, or 480a, 480b, and 480c generated as the current coding unit 400 or 450 is split to be different from that of the other coding units 430a and 430c, or 480a and 480c. For example, the image decoding device 100 may restrict the coding unit 430b or 480b at the center location to be no longer split or to be split only a preset number of times, unlike the other coding units 430a and 430c, or 480a and 480c.

Figure 5:
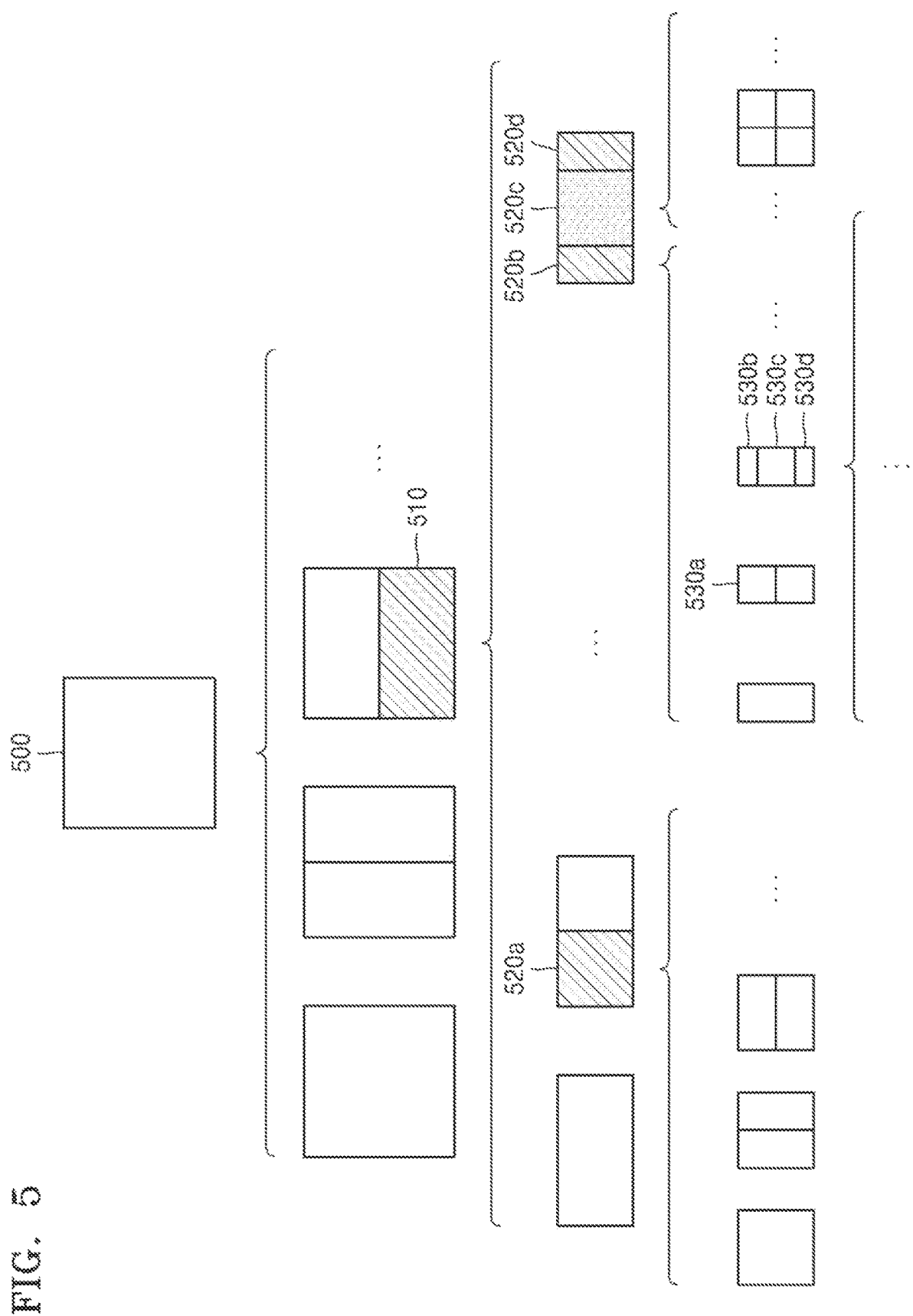
FIG. 5 illustrates a process, performed by an image decoding device, of splitting a coding unit based on at least one of block shape information and split shape mode information, according to an embodiment.

FIG. 5 illustrates a process, performed by an image decoding device, of splitting a coding unit based on at least one of block shape information and split shape mode information, according to an embodiment.

According to an embodiment, the image decoding device 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding device 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding device 100 may determine to split or not to split the determined second coding unit 510 into coding units, based on the split shape mode information. Referring to FIG. 5, the image decoding device 100 may split the non-square second coding unit 510, which is determined by splitting the first coding unit 500, into one or more third coding units 520a, 520b, 520c, and 520d based on at least one of the split shape mode information and the split shape mode information, or may not split the non-square second coding unit 510. The image decoding device 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) from among an odd number of third coding units 520b, 520c, and 520d determined by splitting the non-square second coding unit 510 may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be re-split into a plurality of coding units. For example, the non-square fourth coding unit 530b or 530d may be re-split into an odd number of coding units. A method that may be used to recursively split a coding unit will be described below in relation to various embodiments.

According to an embodiment, the image decoding device 100 may split each of the third coding units 520a, or 520b, 520c, and 520d into coding units, based on the split shape mode information. Also, the image decoding device 100 may determine not to split the second coding unit 510 based on the split shape mode information. According to an embodiment, the image decoding device 100 may split the non-square second coding unit 510 into the odd number of third coding units 520b, 520c, and 520d. The image decoding device 100 may put a preset restriction on a preset third coding unit from among the odd number of third coding units 520b, 520c, and 520d. For example, the image decoding device 100 may restrict the third coding unit 520c at a center location from among the odd number of third coding units 520b, 520c, and 520d to be no longer split or to be split a settable number of times.

Referring to FIG. 5, the image decoding device 100 may restrict the third coding unit 520c, which is at the center location from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding device 100 may obtain the split shape mode information, which is used to split a current coding unit, from a preset location in the current coding unit.

Figure 6:
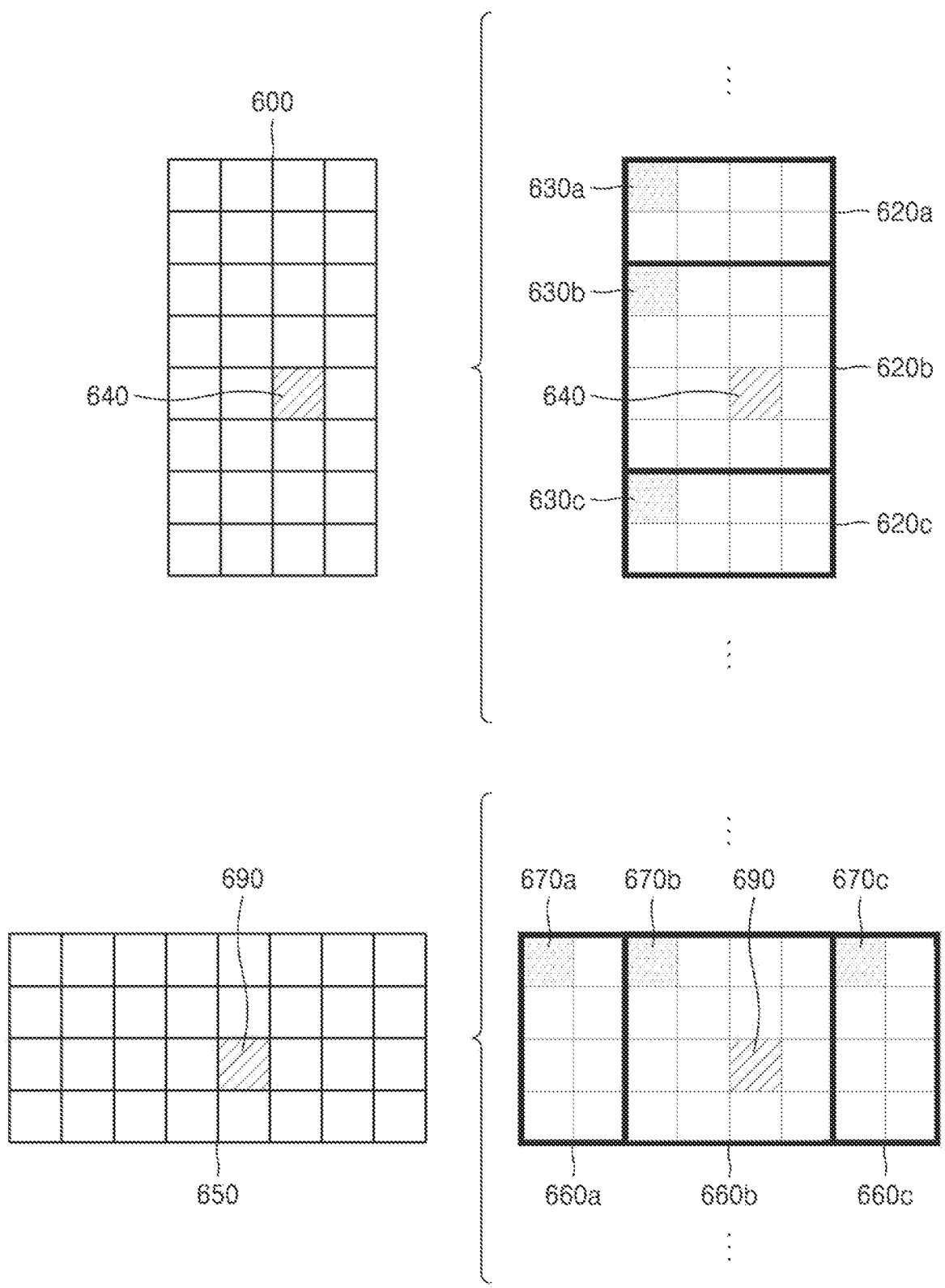
FIG. 6 illustrates a method, performed by an image decoding device, of determining a preset coding unit from among an odd number of coding units, according to an embodiment.

FIG. 6 illustrates a method, performed by an image decoding device, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding device 100 may obtain the split shape mode information from the preset location and may determine to split or not to split the current coding unit into various-shaped and various-sized coding units.

According to an embodiment, when the current coding unit is split into a preset number of coding units, the image decoding device 100 may select one of the coding units. Various methods may be used to select one of a plurality of coding units, as will be described below in relation to various embodiments.

According to an embodiment, the image decoding device 100 may split the current coding unit into a plurality of coding units, and may determine a coding unit at a preset location.

According to an embodiment, image decoding device 100 may use information indicating locations of the odd number of coding units, to determine a coding unit at a center location from among the odd number of coding units. Referring to FIG. 6, the image decoding device 100 may determine the odd number of coding units 620*a*, 620*b*, and 620*c* or the odd number of coding units 660*a*, 660*b*, and 660*c* by splitting the current coding unit 600 or the current coding unit 650. The image decoding device 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding device 100 may determine the coding unit 620*b* of the center location by determining the locations of the coding units 620*a*, 620*b*, and 620*c* based on information indicating locations of preset samples included in the coding units 620*a*, 620*b*, and 620*c*. In detail, the image decoding device 100 may determine the coding unit 620*b* at the center location by determining the locations of the coding units 620*a*, 620*b*, and 620*c* based on information indicating locations of upper-left samples 630*a*, 630*b*, and 630*c* of the coding units 620*a*, 620*b*, and 620*c*.

According to an embodiment, the information indicating the locations of the upper-left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper-left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding device 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper-left sample 630*a* of the upper coding unit 620*a* may include coordinates (xa, ya), information indicating the location of the upper-left sample 630*b* of the middle coding unit 620*b* may include coordinates (xb, yb), and information indicating the location of the upper-left sample 630*c* of the lower coding unit 620*c* may include coordinates (xc, yc). The image decoding device 100 may determine the middle coding unit 620*b* by using the coordinates of the upper-left samples 630*a*, 630*b*, and 630*c* which are included in the coding units 620*a*, 620*b*, and 620*c*, respectively. For example, when the coordinates of the upper-left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper-left samples 630*a*, 630*b*, and 630*c* may include coordinates indicating absolute locations in the picture, or may use coordinates (dxb, dyb) indicating a relative location of the upper-left sample 630*b* of the middle coding unit 620*b* and coordinates (dxc, dyc) indicating a relative location of the upper-left sample 630*c* of the lower coding unit 620*c* with reference to the location of the upper-left sample 630*a* of the upper coding unit 620*a*. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding device 100 may split the current coding unit 600 into a plurality of coding units 620*a*, 620*b*, and 620*c*, and may select one of the coding units 620*a*, 620*b*, and 620*c* based on a preset criterion. For example, the image decoding device 100 may select the coding unit 620*b*, which has a size different from that of the others, from among the coding units 620*a*, 620*b*, and 620*c*.

According to an embodiment, the image decoding device 100 may determine the width or height of each of the coding units 620*a*, 620*b*, and 620*c* by using the coordinates (xa, ya) that is the information indicating the location of the upper-left sample 630*a* of the upper coding unit 620*a*, the coordinates (xb, yb) that is the information indicating the location of the upper-left sample 630*b* of the middle coding unit 620*b*, and the coordinates (xc, yc) that is the information indicating the location of the upper-left sample 630*c* of the lower coding unit 620*c*. The image decoding device 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding device 100 may determine the width of the upper coding unit 620*a* to be the width of the current coding unit 600. The image decoding device 100 may determine the height of the upper coding unit 620*a* to be yb-ya. According to an embodiment, the image decoding device 100 may determine the width of the middle coding unit 620*b* to be the width of the current coding unit 600. The image decoding device 100 may determine the height of the middle coding unit 620*b* to be yc-yb. According to an embodiment, the image decoding device 100 may determine the width or height of the lower coding unit 620*c* by using the width or height of the current coding unit 600 or the widths or heights of the upper and middle coding units 620*a* and 620*b*. The image decoding device 100 may determine a coding unit, which has a size different from that of the others, based on the determined widths and heights of the coding units 620*a* to 620*c*. Referring to FIG. 6, the image decoding device 100 may determine the middle coding unit 620*b*, which has a size different from the size of the upper and lower coding units 620*a* and 620*c*, as the coding unit of the preset location. However, the above-described method, performed by the image decoding device 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding device 100 may determine the width or height of each of the coding units 660a, 660b, and 660c by using the coordinates (xd, yd) that is information indicating the location of an upper-left sample 670a of the left coding unit 660a, the coordinates (xe, ye) that is information indicating the location of an upper-left sample 670b of the middle coding unit 660b, and the coordinates (xf, yf) that is information indicating a location of the upper-left sample 670c of the right coding unit 660c. The image decoding device 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding device 100 may determine the width of the left coding unit 660a to be xe-xd. The image decoding device 100 may determine the height of the left coding unit 660a to be the height of the current coding unit 650. According to an embodiment, the image decoding device 100 may determine the width of the middle coding unit 660b to be xf-xe. The image decoding device 100 may determine the height of the middle coding unit 660b to be the height of the current coding unit 650. According to an embodiment, the image decoding device 100 may determine the width or height of the right coding unit 660c by using the width or height of the current coding unit 650 or the widths or heights of the left and middle coding units 660a and 660b. The image decoding device 100 may determine a coding unit, which has a size different from that of the others, based on the determined widths and heights of the coding units 660a to 660c. Referring to FIG. 6, the image decoding device 100 may determine the middle coding unit 660b, which has a size different from the sizes of the left and right coding units 660a and 660c, as the coding unit of the preset location. However, the above-described method, performed by the image decoding device 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper left locations, and information about arbitrary locations of samples included in the coding units may be used.

According to an embodiment, the image decoding device 100 may select a coding unit at a preset location from among an odd number of coding units determined by splitting the current coding unit, considering the shape of the current coding unit. For example, when the current coding unit has a non-square shape, a width of which is longer than a height, the image decoding device 100 may determine the coding unit at the preset location in a horizontal direction. That is, the image decoding device 100 may determine one of coding units at different locations in a horizontal direction and put a restriction on the coding unit. When the current coding unit has a non-square shape, a height of which is longer than a width, the image decoding device 100 may determine the coding unit at the preset location in a vertical direction. That is, the image decoding device 100 may determine one of coding units at different locations in a vertical direction and may put a restriction on the coding unit.

According to an embodiment, the image decoding device 100 may use information indicating respective locations of an even number of coding units, to determine the coding unit at the preset location from among the even number of coding units. The image decoding device 100 may determine an even number of coding units by splitting (binary splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding device 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding device 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding device 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding device 100 may use the split shape mode information, which is obtained from a sample at a preset location in the current coding unit 600 (e.g., a sample at a center location of the current coding unit 600) to determine a coding unit at a preset location from among the plurality of the coding units 620a, 620b, and 620c determined by splitting the current coding unit 600 (e.g., a coding unit at a center location from among a plurality of split coding units). That is, the image decoding device 100 may determine the sample at the preset location by considering a block shape of the current coding unit 600, determine the coding unit 620b including a sample, from which preset information (e.g., the split shape mode information) may be obtained, from among the plurality of coding units 620*a*, 620*b*, and 620*c* determined by splitting the current coding unit 600, and may put a preset restriction on the coding unit 620*b*. Referring to FIG. 6, according to an embodiment, the image decoding device 100 may determine the sample 640 at the center location of the current coding unit 600 as the sample from which the preset information may be obtained, and may put a preset restriction on the coding unit 620*b* including the sample 640, in a decoding operation. However, the location of the sample from which the preset information may be obtained is not limited to the above-described location, and may include arbitrary locations of samples included in the coding unit 620*b* to be determined for a restriction.

According to an embodiment, the location of the sample from which the preset information may be obtained may be determined based on the shape of the current coding unit 600. According to an embodiment, the block shape information may indicate whether the current coding unit has a square or non-square shape, and the location of the sample from which the preset information may be obtained may be determined based on the shape. For example, the image decoding device 100 may determine a sample located on a boundary for splitting at least one of a width and height of the current coding unit in half, as the sample from which the preset information may be obtained, by using at least one of information about the width of the current coding unit and information about the height of the current coding unit. As another example, when the block shape information of the current coding unit indicates a non-square shape, the image decoding device 100 may determine one of samples adjacent to a boundary for splitting a long side of the current coding unit in half, as the sample from which the preset information may be obtained.

According to an embodiment, when the current coding unit is split into a plurality of coding units, the image decoding device 100 may use the split shape mode information to determine a coding unit at a preset location from among the plurality of coding units. According to an embodiment, the image decoding device 100 may obtain the split shape mode information from a sample at a preset location in a coding unit, and split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof will not be provided here.

According to an embodiment, the image decoding device 100 may determine one or more coding units by splitting the current coding unit, and may determine an order of decoding the one or more coding units, based on a preset block (e.g., the current coding unit).

Figure 7:
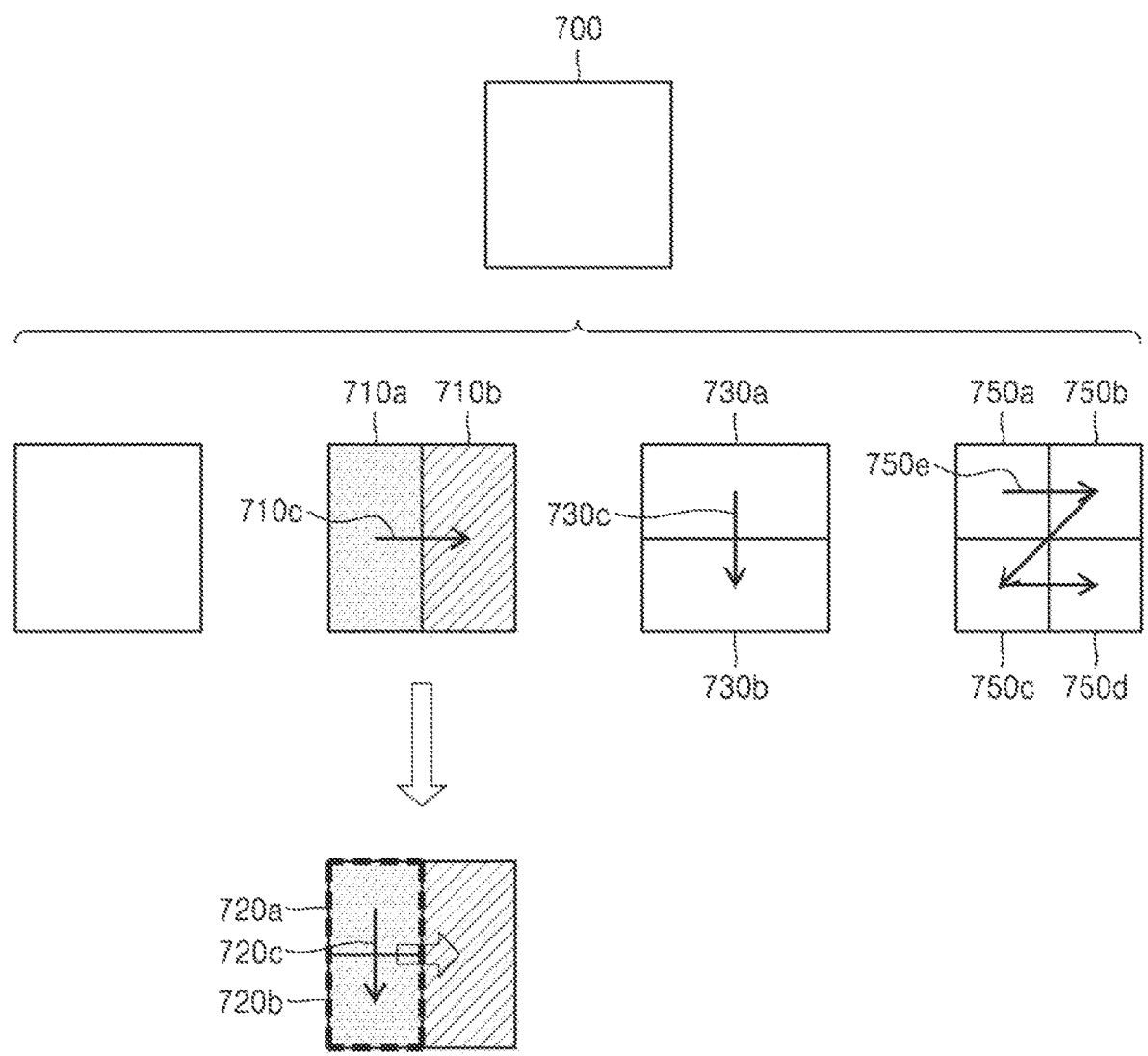
FIG. 7 illustrates an order of processing a plurality of coding units when an image decoding device determines the plurality of coding units by splitting a current coding unit, according to an embodiment.

FIG. 7 illustrates an order of processing a plurality of coding units when an image decoding device determines the plurality of coding units by splitting a current coding unit, according to an embodiment.

According to an embodiment, the image decoding device 100 may determine second coding units 710*a* and 710*b* by splitting a first coding unit 700 in a vertical direction, may determine second coding units 730*a* and 730*b* by splitting the first coding unit 700 in a horizontal direction, or may determine second coding units 750*a*, 750*b*, 750*c*, and 750*d* by splitting the first coding unit 700 in vertical and horizontal directions, based on split shape mode information.

Referring to FIG. 7, the image decoding device 100 may determine to process the second coding units 710*a* and 710*b*, which are determined by splitting the first coding unit 700 in a vertical direction, in a horizontal direction order 710*c*. The image decoding device 100 may determine to process the second coding units 730*a* and 730*b*, which are determined by splitting the first coding unit 700 in a horizontal direction, in a vertical direction order 730*c*. The image decoding device 100 may determine the second coding units 750*a*, 750*b*, 750*c*, and 750*d*, which are determined by splitting the first coding unit 700 in vertical and horizontal directions, according to a preset order (e.g., a raster scan order or Z-scan order 750*e*) by which coding units in a row are processed and then coding units in a next row are processed.

According to an embodiment, the image decoding device 100 may recursively split coding units. Referring to FIG. 7, the image decoding device 100 may determine the plurality of coding units 710*a* and 710*b*, 730*a* and 730*b*, or 750*a*, 750*b*, 750*c*, and 750*d* by splitting the first coding unit 700, and recursively split each of the determined plurality of coding units 710*a*, 710*b*, 730*a*, 730*b*, 750*a*, 750*b*, 750*c*, and 750*d*. A splitting method of the plurality of coding units 710*a* and 710*b*, 730*a* and 730*b*, or 750*a*, 750*b*, 750*c*, and 750*d* may correspond to a splitting method of the first coding unit 700. As such, each of the plurality of coding units 710*a* and 710*b*, 730*a* and 730*b*, or 750*a*, 750*b*, 750*c*, and 750*d* may be independently split into a plurality of coding units. Referring to FIG. 7, the image decoding device 100 may determine the second coding units 710*a* and 710*b* by splitting the first coding unit 700 in a vertical direction, and may determine to independently split or not to split each of the second coding units 710*a* and 710*b*.

According to an embodiment, the image decoding device 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding device 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Also, because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a preset order.

Figure 8:
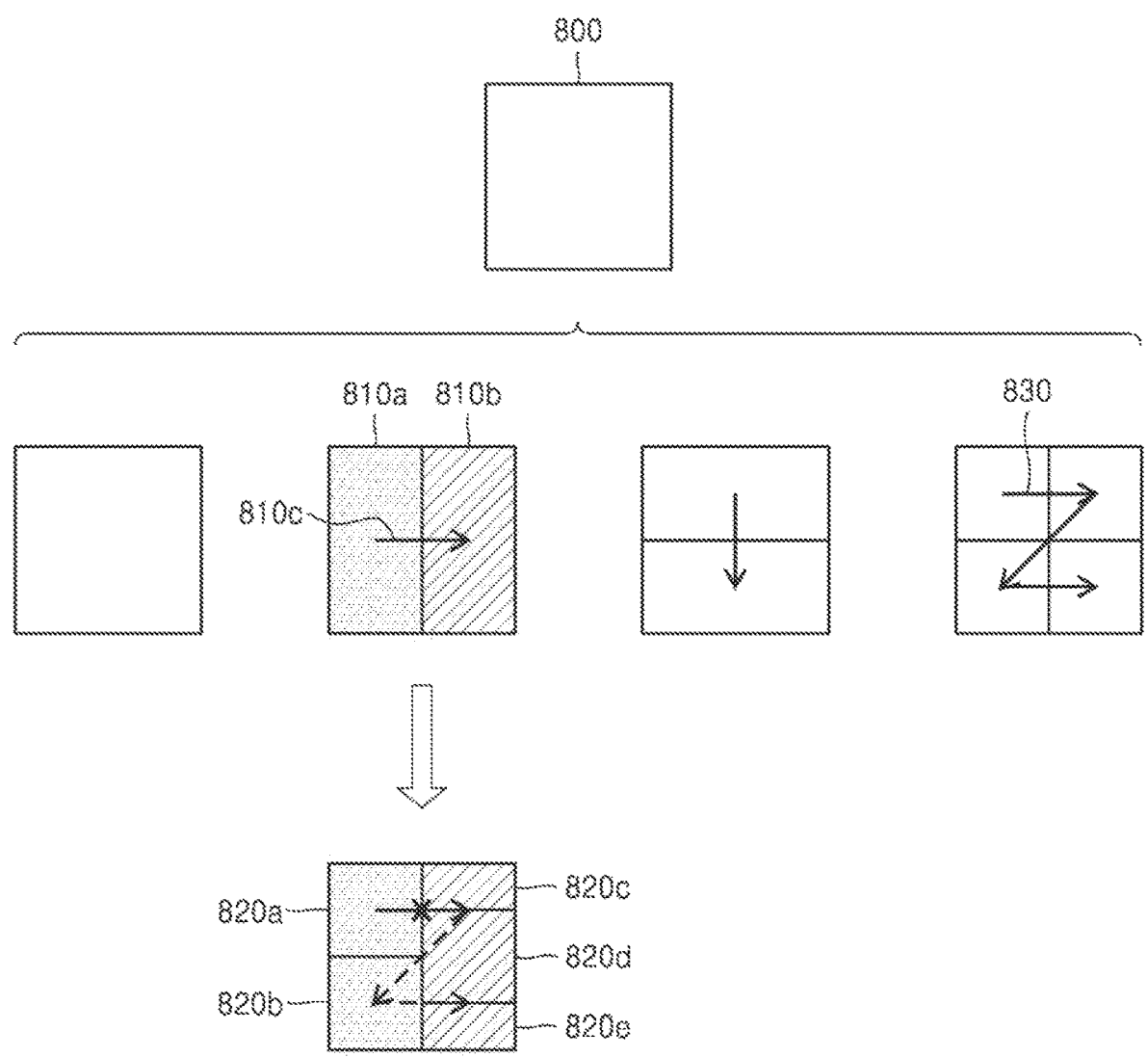
FIG. 8 illustrates a process, performed by an image decoding device, of determining that a current coding unit is to be split into an odd number of coding units, when the coding units are not processable in a preset order, according to an embodiment.

FIG. 8 illustrates a process, performed by an image decoding device, of determining that a current coding unit is to be split into an odd number of coding units, when the coding units are not processable in a preset order, according to an embodiment.

According to an embodiment, the image decoding device 100 may determine that the current coding unit is split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c* to 820*e*. According to an embodiment, the image decoding device 100 may determine the plurality of third coding units 820*a* and 820*b* by splitting the left second coding unit 810*a* in a horizontal direction, and may split the right second coding unit 810*b* into the odd number of third coding units 820*c* to 820*e*.

According to an embodiment, the video decoding device 100 may determine whether any coding unit is split into an odd number of coding units, by determining whether the third coding units 820*a* and 820*b*, and 820*c* to 820*e* are processable in a preset order. Referring to FIG. 8, the image decoding device 100 may determine the third coding units 820*a* and 820*b*, and 820*c* to 820*e* by recursively splitting the first coding unit 800. The image decoding device 100 may determine whether any of the first coding unit 800, the second coding units 810*a* and 810*b*, or the third coding units 820*a* and 820*b*, and 820*c* to 820*e* are split into an odd number of coding units, based on at least one of the block shape information and the split shape mode information. For example, a coding unit located in the right from among the second coding units 810*a* and 810*b* may be split into an odd number of third coding units 820*c*, 820*d*, and 820*e*. A processing order of a plurality of coding units included in the first coding unit 800 may be a preset order (e.g., a Z-scan order 830), and the image decoding device 100 may determine whether the third coding units 820*c*, 820*d*, and 820*e*, which are determined by splitting the right second coding unit 810*b* into an odd number of coding units, satisfy a condition for processing in the preset order.

According to an embodiment, the image decoding device 100 may determine whether the third coding units 820*a* and 820*b*, and 820*c* to 820*e* included in the first coding unit 800 satisfy the condition for processing in the preset order, and the condition relates to whether at least one of a width and height of the second coding units 810*a* and 810*b* is to be split in half along a boundary of the third coding units 820*a* and 820*b*, and 820*c* to 820*e*. For example, the third coding units 820*a* and 820*b* determined when the height of the left second coding unit 810*a* of the non-square shape is split in half may satisfy the condition. It may be determined that the third coding units 820*c* to 820*e* do not satisfy the condition because the boundaries of the third coding units 820*c* to 820*e* determined when the right second coding unit 810*b* is split into three coding units are unable to split the width or height of the right second coding unit 810*b* in half. When the condition is not satisfied as described above, the image decoding device 100 may determine disconnection of a scan order, and may determine that the right second coding unit 810*b* is to be split into an odd number of coding units, based on a result of the determination. According to an embodiment, when a coding unit is split into an odd number of coding units, the image decoding device 100 may put a preset restriction on a coding unit at a preset location from among the split coding units. The restriction or the preset location has been described above in relation to various embodiments, and thus detailed descriptions thereof will not be provided herein.

Figure 9:
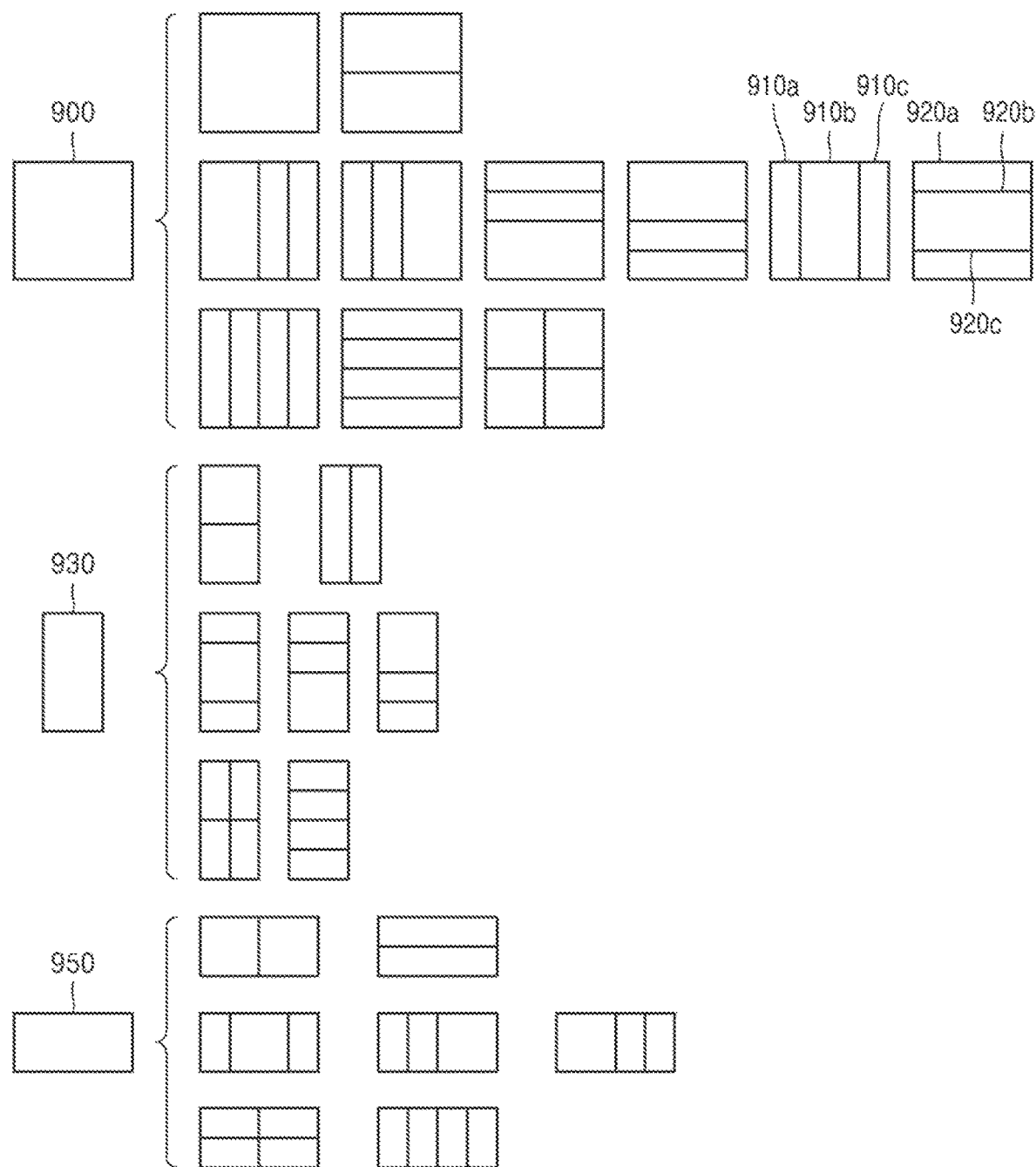
FIG. 9 illustrates a process, performed by an image decoding device, of determining at least one coding unit by splitting a first coding unit, according to an embodiment.

FIG. 9 illustrates a process, performed by an image decoding device, of determining at least one coding unit by splitting a first coding unit, according to an embodiment.

According to an embodiment, the image decoding device 100 may split the first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding device 100 may split the first coding unit 900 into a plurality of non-square coding units. In detail, when the split shape mode information indicates to determine an odd number of coding units by splitting the first coding unit 900 in a horizontal direction or a vertical direction, the image decoding device 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding device 100 may determine whether the second coding units 910*a*, 910*b*, 910*c*, 920*a*, 920*b*, and 920*c* included in the first coding unit 900 satisfy a condition for processing in a preset order, and the condition relates to whether at least one of a width and height of the first coding unit 900 is to be split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the width of the first coding unit 900 in half, it may be determined that the first coding unit 900 does not satisfy the condition for processing in the preset order. Also, because boundaries of the second coding units 920*a*, 920*b*, and 920*c* determined by splitting the square first coding unit 900 in a horizontal direction do not split the height of the first coding unit 900 in half, it may be determined that the first coding unit 900 does not satisfy the condition for processing in the preset order. When the condition is not satisfied as described above, the image decoding device 100 may decide disconnection of a scan order, and may determine that the first coding unit 900 is to be split into an odd number of coding units, based on a result of the decision. According to an embodiment, when a coding unit is split into an odd number of coding units, the image decoding device 100 may put a preset restriction on a coding unit at a preset location from among the split coding units. The restriction or the preset location has been described above in relation to various embodiments, and thus detailed descriptions thereof will not be provided herein.

According to an embodiment, the image decoding device 100 may determine various-shaped coding units by splitting a first coding unit.

Referring to FIG. 9, the image decoding device 100 may split the square first coding unit 900 or a non-square first coding unit 930 or 950 into various-shaped coding units.

Figure 10:
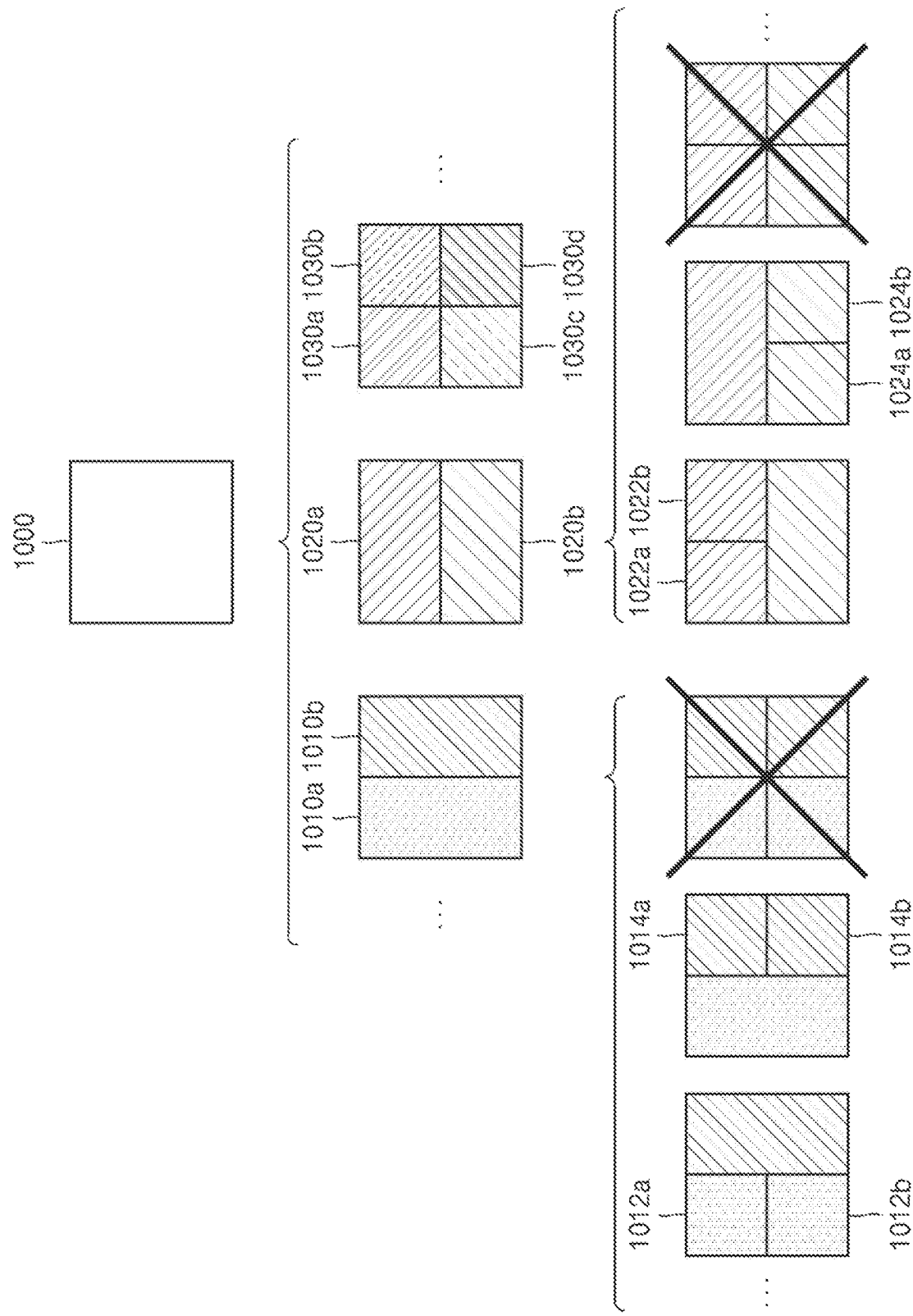
FIG. 10 illustrates that a shape into which a second coding unit is splittable is restricted when the second coding unit having a non-square shape, which is determined when an image decoding device splits a first coding unit, satisfies a preset condition, according to an embodiment.

FIG. 10 illustrates that a shape into which a second coding unit is splittable is restricted when the second coding unit having a non-square shape, which is determined when an image decoding device splits a first coding unit, satisfies a preset condition, according to an embodiment.

According to an embodiment, the image decoding device 100 may determine to split the square first coding unit 1000 into non-square second coding units 1010*a* and 1010*b* or 1020*a* and 1020*b*, based on split shape mode information, which is obtained by the receiver 110. The second coding units 1010*a* and 1010*b*, or 1020*a* and 1020*b* may be independently split. As such, the image decoding device 100 may determine to split or not to split each of the second coding units 1010a and 1010b, or 1020a and 1020b into a plurality of coding units, based on the split shape mode information of each of the second coding units 1010a and 1010b, or 1020a and 1020b. According to an embodiment, the image decoding device 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding device 100 may restrict the right second coding unit 1010b not to be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding device 100 splits the first coding unit 1000 into four square second coding units 1030a, 1030b, 1030c, and 1030d, based on the split shape mode information, and may be inefficient in terms of image decoding.

According to an embodiment, the image decoding device 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding device 100 may restrict the other second coding unit (e.g., the lower second coding unit 1020b) not to be split in a vertical direction in which the upper second coding unit 1020a is split.

Figure 11:
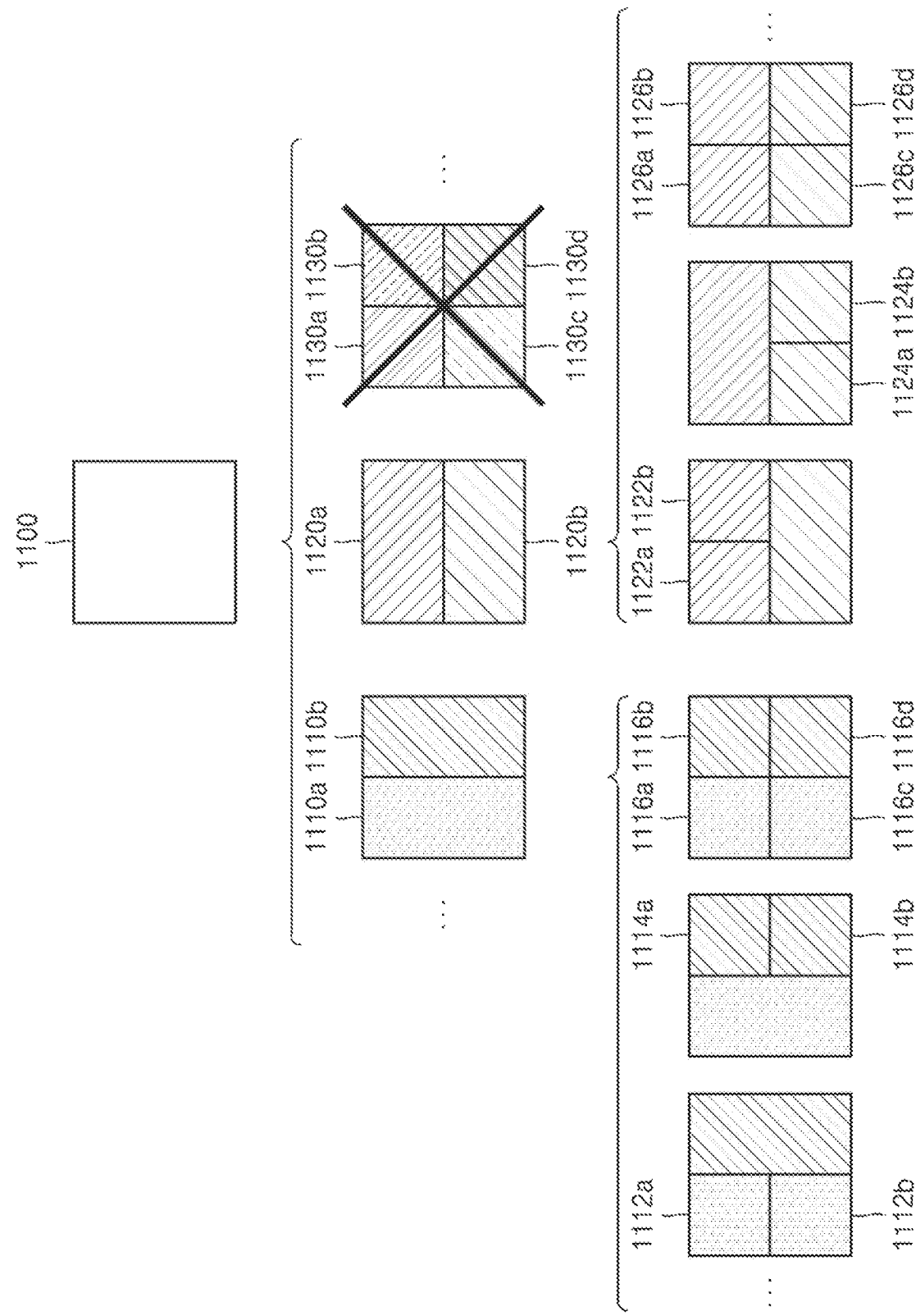
FIG. 11 illustrates a process, performed by an image decoding device, of splitting a square coding unit when split shape mode information indicates that the square coding unit is not to be split into four square coding units, according to an embodiment.

FIG. 11 illustrates a process, performed by an image decoding device, of splitting a square coding unit when split shape mode information indicates that the square coding unit is not to be split into four square coding units, according to an embodiment.

According to an embodiment, the image decoding device 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding device 100 may not split the square first coding unit 1100 into four square second coding units 1130a, 1130b, 1130c, and 1130d. The image decoding device 100 may determine the non-square second coding units 1110a and 1110b, or 1120a and 1120b, etc., based on the split shape mode information.

According to an embodiment, the image decoding device 100 may independently split the non-square second coding units 1110a and 1110b, or 1120a and 1120b, etc. Each of the second coding units 1110a and 1110b, or 1120a and 1120b, etc. may be recursively split in a preset order, and this splitting method may correspond to a method of splitting the first coding unit 1100, based on the split shape mode information.

For example, the image decoding device 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding device 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding device 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding device 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
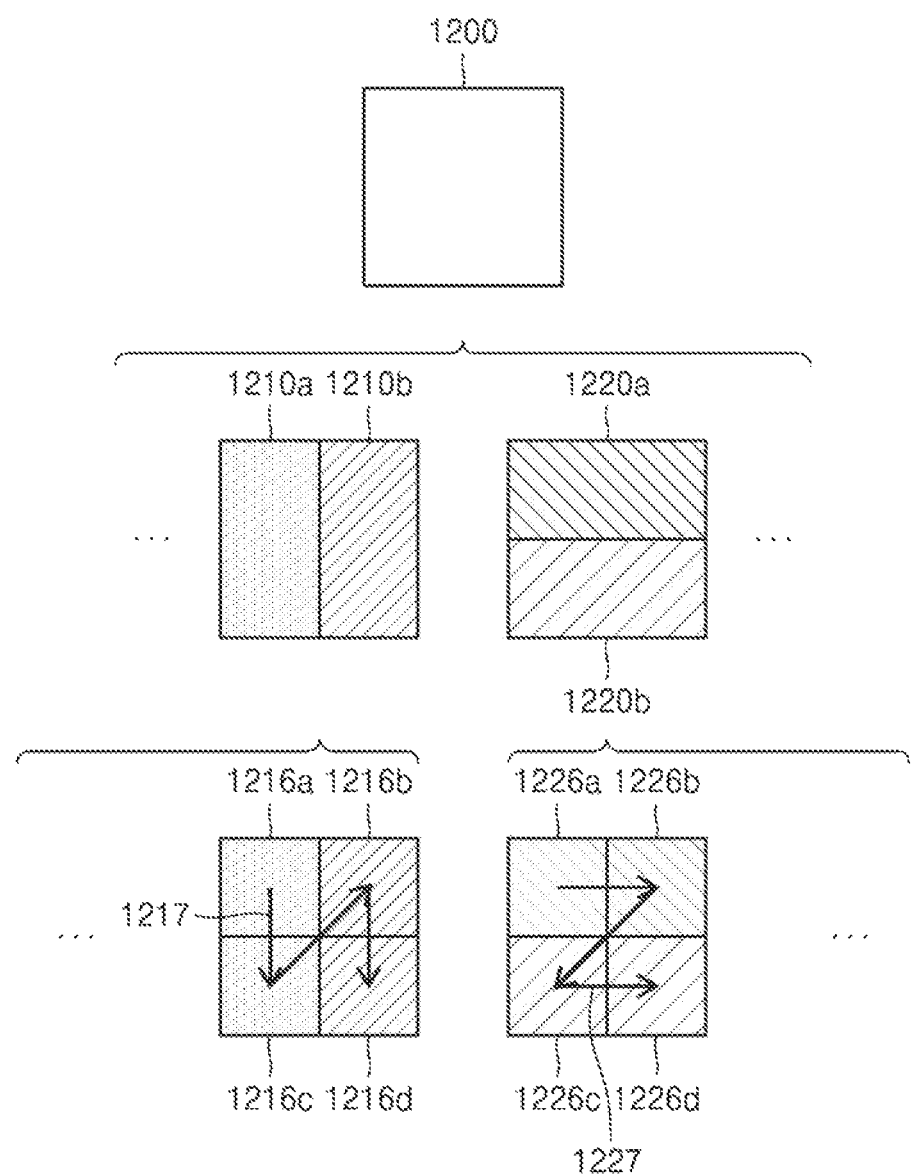
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding device 100 may split a first coding unit 1200, based on split shape mode information. When a block shape indicates a square shape and the split shape mode information indicates to split the first coding unit 1200 in at least one of horizontal and vertical directions, the image decoding device 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding device 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof will not be provided herein.

According to an embodiment, the image decoding device 100 may process coding units in a preset order. An operation of processing coding units in a preset order has been described above in relation to FIG. 7, and thus detailed descriptions thereof will not be provided herein. Referring to FIG. 12, the image decoding device 100 may determine four square third coding units 1216a, 1216b, 1216c, and 1216d, and 1226a, 1226b, 1226c, and 1226d by splitting the square first coding unit 1200. According to an embodiment, the image decoding device 100 may determine processing orders of the third coding units 1216a, 1216b, 1216c, and 1216d, and 1226a, 1226b, 1226c, and 1226d based on a split shape by which the first coding unit 1200 is split.

According to an embodiment, the image decoding device 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding device 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding device 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding device 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding device 100 may determine that a depth of the current coding unit is increased from a depth of the coding unit before being split, by n. In the following description, a coding unit having an increased depth is expressed as a coding unit of a lower depth.

Referring to FIG. 13, according to an embodiment, the image decoding device 100 may determine a second coding unit 1302 and a third coding unit 1304 of lower depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding device 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding device 100 may determine a second coding unit 1302, 1312, or 1322 by splitting at least one of a width and height of the first coding unit 1310 having a size of N×2N. That is, the image decoding device 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding device 100 may determine the second coding unit 1302, 1312, or 1322 by splitting at least one of a width and height of the first coding unit 1320 having a size of 2N×N. That is, the image decoding device 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding device 100 may determine a third coding unit 1304, 1314, or 1324 by splitting at least one of a width and height of the second coding unit 1302 having a size of N×N. That is, the image decoding device 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding device 100 may determine the third coding unit 1304, 1314, or 1324 by splitting at least one of a width and height of the second coding unit 1312 having a size of N/2×N. That is, the image decoding device 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding device 100 may determine the third coding unit 1304, 1314, or 1324 by splitting at least one of a width and height of the second coding unit 1322 having a size of N×N/2. That is, the image decoding device 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding device 100 may split the square coding unit 1300, 1302, or 1304 in a horizontal or vertical direction. For example, the image decoding device 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
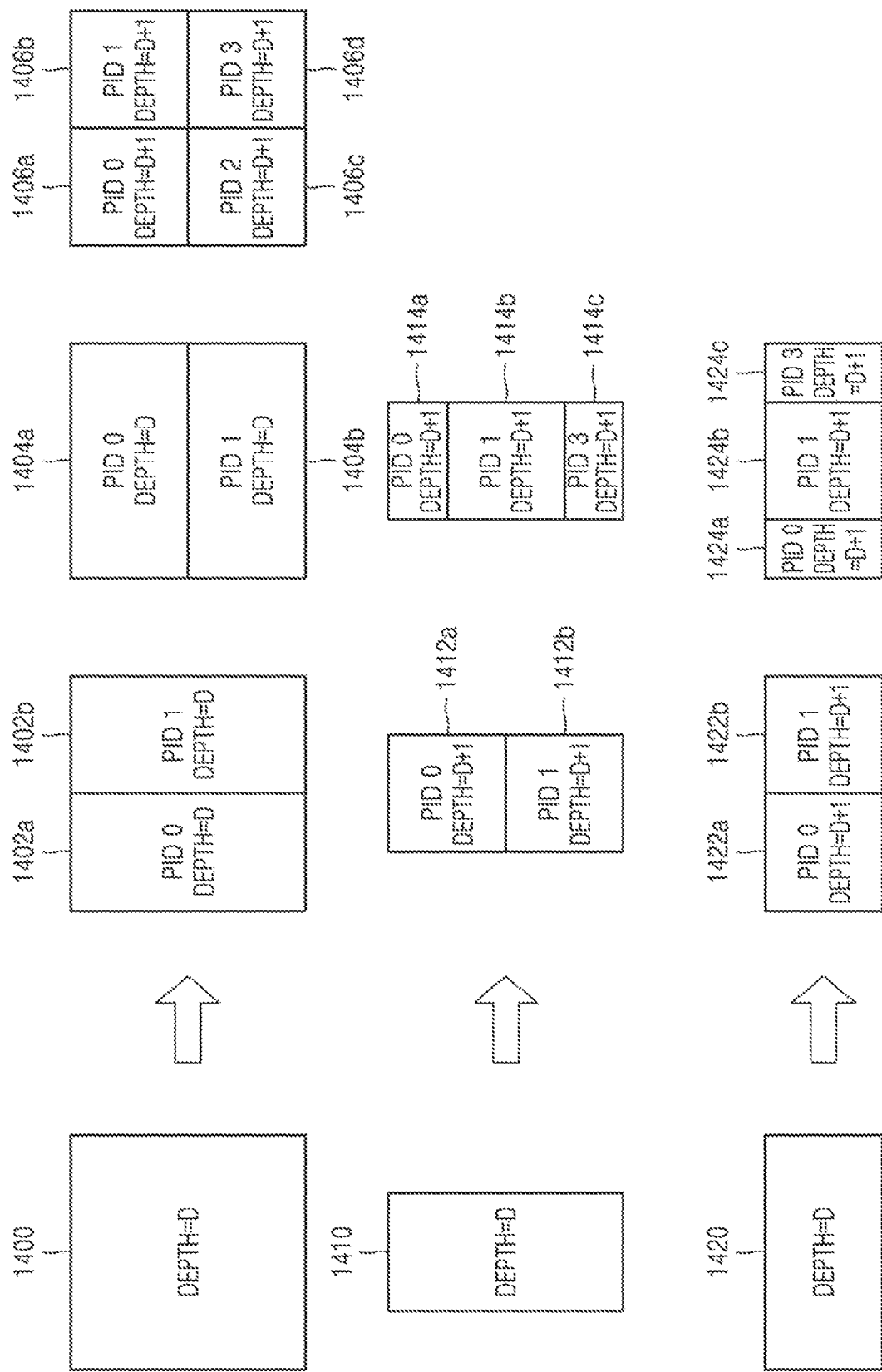
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding device 100 may determine various-shape second coding units by splitting a square first coding unit 1400. Referring to FIG. 14, the image decoding device 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding device 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400 may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding device 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding device 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding device 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding device 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding device 100 may determine depths of coding units split from the first coding unit 1420 having a non-square shape, a width of which is longer than a height, by using the above-described method of determining depths of coding units split from the first coding unit 1410.

According to an embodiment, the image decoding device 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding device 100 may determine whether an odd number of split coding units do not have equal sizes, based on whether discontinuity is present in PIDs for identifying the split coding units.

According to an embodiment, the image decoding device 100 may determine whether to use a specific splitting method, based on PID values for identifying a plurality of coding units determined by splitting a current coding unit. Referring to FIG. 14, the image decoding device 100 may determine an even number of coding units 1412a and 1412b or an odd number of coding units 1414a, 1414b, and 1414c by splitting the first coding unit 1410 having a rectangular shape, a height of which is longer than a width. The image decoding device 100 may use PIDs indicating respective coding units so as to identify the respective coding units. According to an embodiment, the PID may be obtained from a sample at a preset location of each coding unit (e.g., an upper-left sample).

According to an embodiment, the image decoding device 100 may determine a coding unit at a preset location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding device 100 may split the first coding unit 1410 into three coding units 1414*a*, 1414*b*, and 1414*c*. The image decoding device 100 may assign a PID to each of the three coding units 1414*a*, 1414*b*, and 1414*c*. The image decoding device 100 may compare PIDs of an odd number of split coding units to determine a coding unit at a center location from among the coding units. The image decoding device 100 may determine the coding unit 1414*b* having a PID corresponding to a middle value among the PIDs of the coding units, as the coding unit at the center location from among the coding units determined by splitting the first coding unit 1410. According to an embodiment, the image decoding device 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding device 100 may determine that a coding unit is split into a plurality of coding units including a coding unit having a size different from that of the other coding units. According to an embodiment, when the split shape mode information indicates to split a coding unit into an odd number of coding units, the image decoding device 100 may split a current coding unit in such a manner that a coding unit of a preset location among an odd number of coding units (e.g., a coding unit of a center location) has a size different from that of the other coding units. In this case, the image decoding device 100 may determine the coding unit of the center location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding device 100 may use a preset data unit where a coding unit starts to be recursively split.

Figure 15:
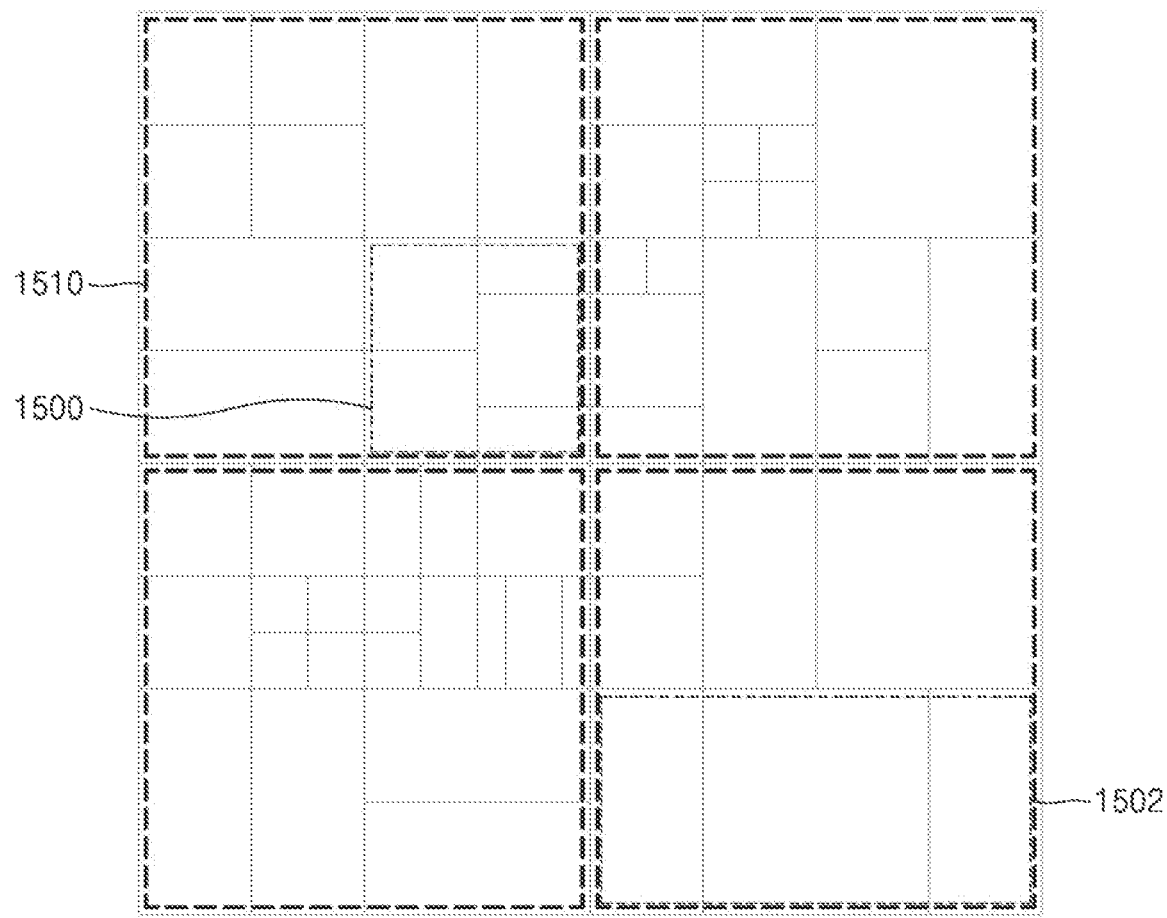
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding device 100 may split the current picture into a plurality of reference data units. According to an embodiment, the image decoding device 100 may split the plurality of reference data units, which are split from the current picture, by using the split shape mode information of each reference data unit. The operation of splitting the reference data unit may correspond to a splitting operation using a quadtree structure.

According to an embodiment, the image decoding device 100 may previously determine the minimum size allowed for the reference data units included in the current picture. Accordingly, the image decoding device 100 may determine various reference data units having sizes equal to or greater than the minimum size, and may determine one or more coding units by using the split shape mode information with reference to the determined reference data unit.

Referring to FIG. 15, the image decoding device 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding device 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding device 100 may use a PID for identifying the size and shape of reference coding units, to determine the size and shape of reference coding units according to some data units previously determined based on a preset condition. That is, the receiver 110 may obtain, from the bitstream, only the PID for identifying the size and shape of reference coding units with respect to each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding device 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding device 100 may determine at least one of the size and shape of reference coding units included in a data unit serving as a unit for obtaining the PID, by selecting the previously determined at least one of the size and shape of reference coding units based on the PID.

According to an embodiment, the image decoding device 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding device 100 may determine the reference coding units by splitting the largest coding unit n times based on a quadtree structure, and may split the reference coding unit based on at least one of the block shape information and the split shape mode information according to various embodiments.

Figure 16:
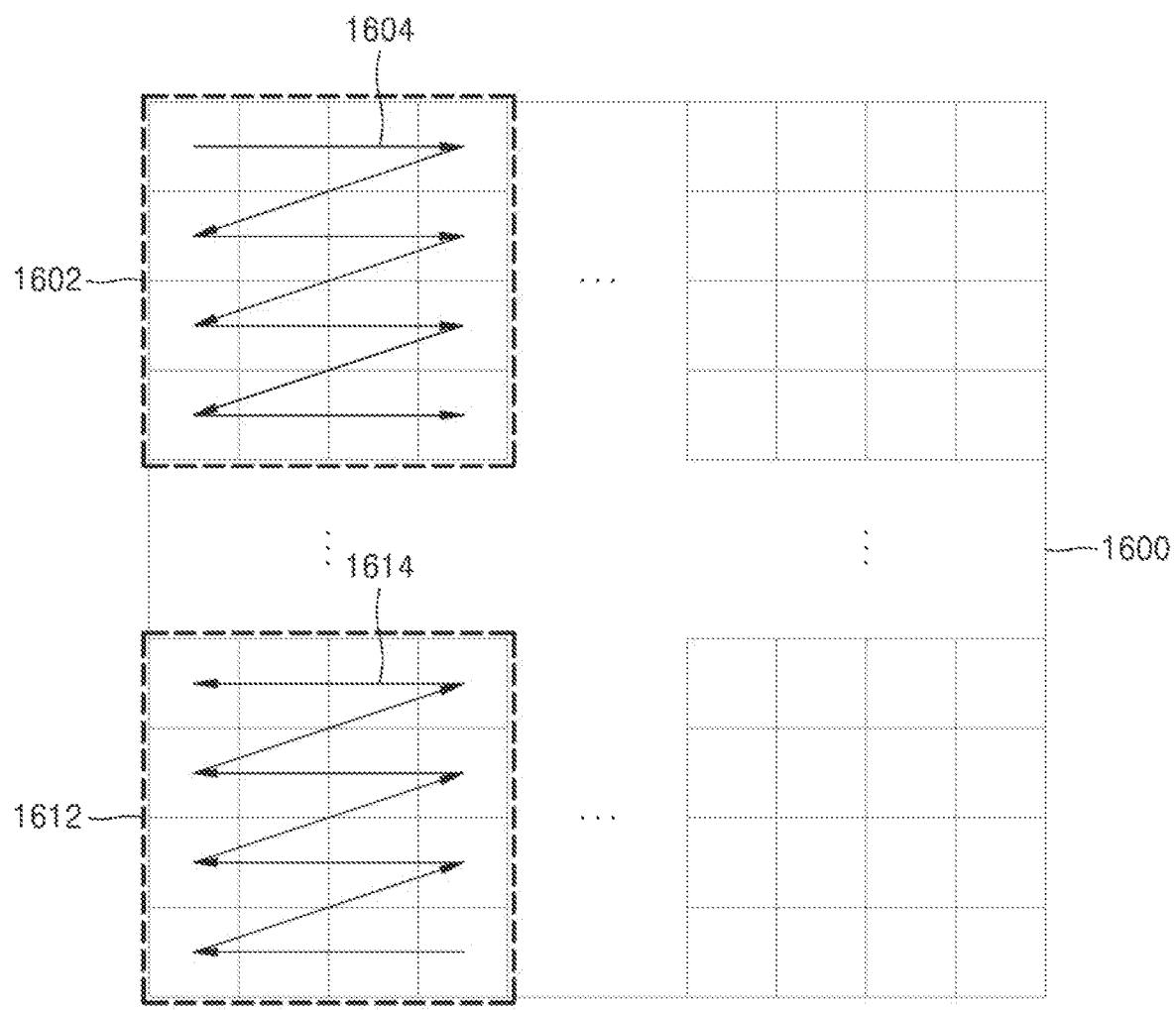
FIG. 16 illustrates a processing block serving as a unit for determining a determination order of reference coding units included in a picture, according to an embodiment.

FIG. 16 illustrates a processing block serving as a unit for determining a determination order of reference coding units included in a picture, according to an embodiment.

According to an embodiment, the image decoding device 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding device 100 may obtain processing block size information and may determine the size of one or more processing blocks included in the picture. The image decoding device 100 may obtain the processing block size information from a bitstream and may determine the size of one or more processing blocks included in the picture. The size of processing blocks may be a preset size of data units, which is indicated by the processing block size information.

According to an embodiment, the receiver 110 of the image decoding device 100 may obtain the processing block size information from the bitstream according to each specific data unit. For example, the processing block size information may be obtained from the bitstream in a data unit such as an image, sequence, picture, slice, slice segment, tile, or tile group. That is, the receiver 110 may obtain the processing block size information from the bitstream according to each of the various data units, and the image decoding device 100 may determine the size of one or more processing blocks, which are split from the picture, by using the obtained processing block size information. The size of the processing blocks may be integer times that of the reference coding units.

According to an embodiment, the image decoding device 100 may determine the size of processing blocks 1602 and 1612 included in the picture 1600. For example, the image decoding device 100 may determine the size of processing blocks based on the processing block size information obtained from the bitstream. Referring to FIG. 16, according to an embodiment, the image decoding device 100 may determine a width of the processing blocks 1602 and 1612 to be four times the width of the reference coding units, and may determine a height of the processing blocks 1602 and 1612 to be four times the height of the reference coding units. The image decoding device 100 may determine a determination order of one or more reference coding units in one or more processing blocks.

According to an embodiment, the image decoding device 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding device 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding device 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding device 100 may determine one or more reference coding units based on the determined determination order.

According to an embodiment, the receiver 110 may obtain the determination order information of reference coding units from the bitstream as information related to the processing blocks 1602 and 1612, and the image decoding device 100 may determine a determination order of one or more reference coding units included in the processing blocks 1602 and 1612 and determine one or more reference coding units, which are included in the picture 1600, based on the determination order. Referring to FIG. 16, the image decoding device 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding device 100 may decode the determined one or more reference coding units. The image decoding device 100 may decode an image, based on the reference coding units determined as described above. A method of decoding the reference coding units may include various image decoding methods.

According to an embodiment, the image decoding device 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding device 100 may use the split shape mode information included in a sequence parameter set, a picture parameter set, a video parameter set, a slice header, a slice segment header, a tile header, or a tile group header. Furthermore, the image decoding device 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding device 100 may determine a split rule of an image. The split rule may be predetermined between the image decoding device 100 and the image encoding device 2200. The image decoding device 100 may determine the split rule of the image, based on information obtained from a bitstream. The image decoding device 100 may determine the split rule based on the information obtained from at least one of a sequence parameter set, a picture parameter set, a video parameter set, a slice header, a slice segment header, a tile header, and a tile group header. The image decoding device 100 may determine the split rule differently according to frames, slices, tiles, temporal layers, largest coding units, or coding units.

The image decoding device 100 may determine the split rule based on a block shape of a coding unit. The block shape may include a size, shape, a ratio of width and height, and a direction of the coding unit. The image encoding device 2200 and the image decoding device 100 may pre-determine to determine the split rule based on the block shape of the coding unit. However, the embodiment is not limited thereto. The image decoding device 100 may determine the split rule based on the information obtained from the bitstream received from the image encoding device 2200.

The shape of the coding unit may include a square and a non-square. When the lengths of the width and height of the coding unit are the same, the image decoding device 100 may determine the shape of the coding unit to be a square. Also, when the lengths of the width and height of the coding unit are not the same, the image decoding device 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding device 100 may apply the same split rule to coding units classified as the same group. For example, the image decoding device 100 may classify coding units having the same lengths of the long sides as having the same size. Also, the image decoding device 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding device 100 may adaptively determine the split rule based on the size of the coding unit. The image decoding device 100 may differently determine an allowable split shape mode based on the size of the coding unit. For example, the image decoding device 100 may determine whether splitting is allowed based on the size of the coding unit. The image decoding device 100 may determine a split direction according to the size of the coding unit. The image decoding device 100 may determine an allowable split type according to the size of the coding unit.

The split rule determined based on the size of the coding unit may be a split rule predetermined between the image encoding device 2200 and the image decoding device 100. Also, the image decoding device 100 may determine the split rule based on the information obtained from the bitstream.

The image decoding device 100 may adaptively determine the split rule based on a location of the coding unit. The image decoding device 100 may adaptively determine the split rule based on the location of the coding unit in the image.

Also, the image decoding device 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

Hereinafter, according to an embodiment disclosed in the present specification, a video encoding/decoding method and device for determining whether a prediction mode of a current block is an affine mode, splitting, when the prediction mode of the current block is an affine mode, a luma block of the current block into a plurality of sub luma blocks having a square shape based on a predefined sub block size, determining a mean luma motion vector for four neighboring sub luma blocks among the plurality of sub luma blocks by using a motion vector of an upper-left sub luma block of the four sub luma blocks and a motion vector of a lower-right sub luma block of the four sub luma blocks, determining the mean luma motion vector to be a motion vector of a current sub chroma block corresponding to the four sub luma blocks, and performing prediction on the current sub chroma block by using the determined motion vector will be described with reference to FIGS. 17 to 20.

Figure 17:
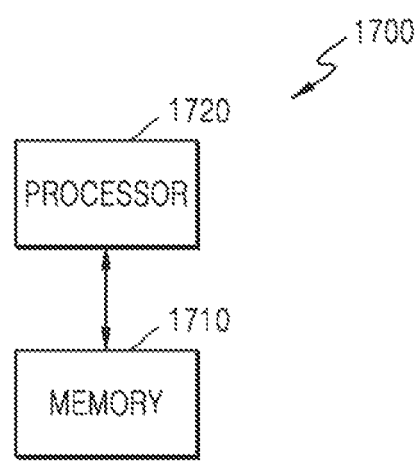
FIG. 17 illustrates a block diagram of a video encoding device according to an embodiment.

FIG. 17 is a block diagram of a video encoding device according to an embodiment.

A video encoding device 1700 according to an embodiment may include a memory 1710, and at least one processor 1720 connected to the memory 1710. Operations of the video encoding device 1700 according to an embodiment may be performed by individual processors or by a control by a central processor. Also, the memory 1710 of the video encoding device 1700 may store data received from outside, and data (for example, a motion vector of a sub luma block, etc.) generated by the processor 1720.

The processor 1720 of the video encoding device 1700 may determine whether a prediction mode of a current block is an affine mode, split, when the prediction mode of the current block is the affine mode, a luma block of the current block into a plurality of sub luma blocks having a square shape based on a predefined sub block size, determine a mean luma motion vector for four neighboring sub luma blocks among the plurality of sub luma blocks by using a motion vector of an upper-left sub luma block of the four sub luma blocks and a motion vector of a lower-right sub luma block of the four sub luma blocks, determine the mean luma motion vector to be a motion vector of a current sub chroma block corresponding to the four sub luma blocks, and perform prediction on the current sub chroma block by using the determined motion vector.

Hereinafter, detailed operations of a video encoding method, performed by the video encoding device 1700 according to an embodiment, of determining whether a prediction mode of a current block is an affine mode, splitting, when the prediction mode of the current block is the affine mode, a luma block of the current block into a plurality of sub luma blocks having a square shape based on a predefined sub block size, determining a mean luma motion vector for four neighboring sub luma blocks among the plurality of sub luma blocks by using a motion vector of an upper-left sub luma block of the four sub luma blocks and a motion vector of a lower-right sub luma block of the four sub luma blocks, determining the mean luma motion vector to be a motion vector of a current sub chroma block corresponding to the four sub luma blocks, and performing prediction on the current sub chroma block by using the determined motion vector will be described with reference to FIG. 18.

Figure 18:
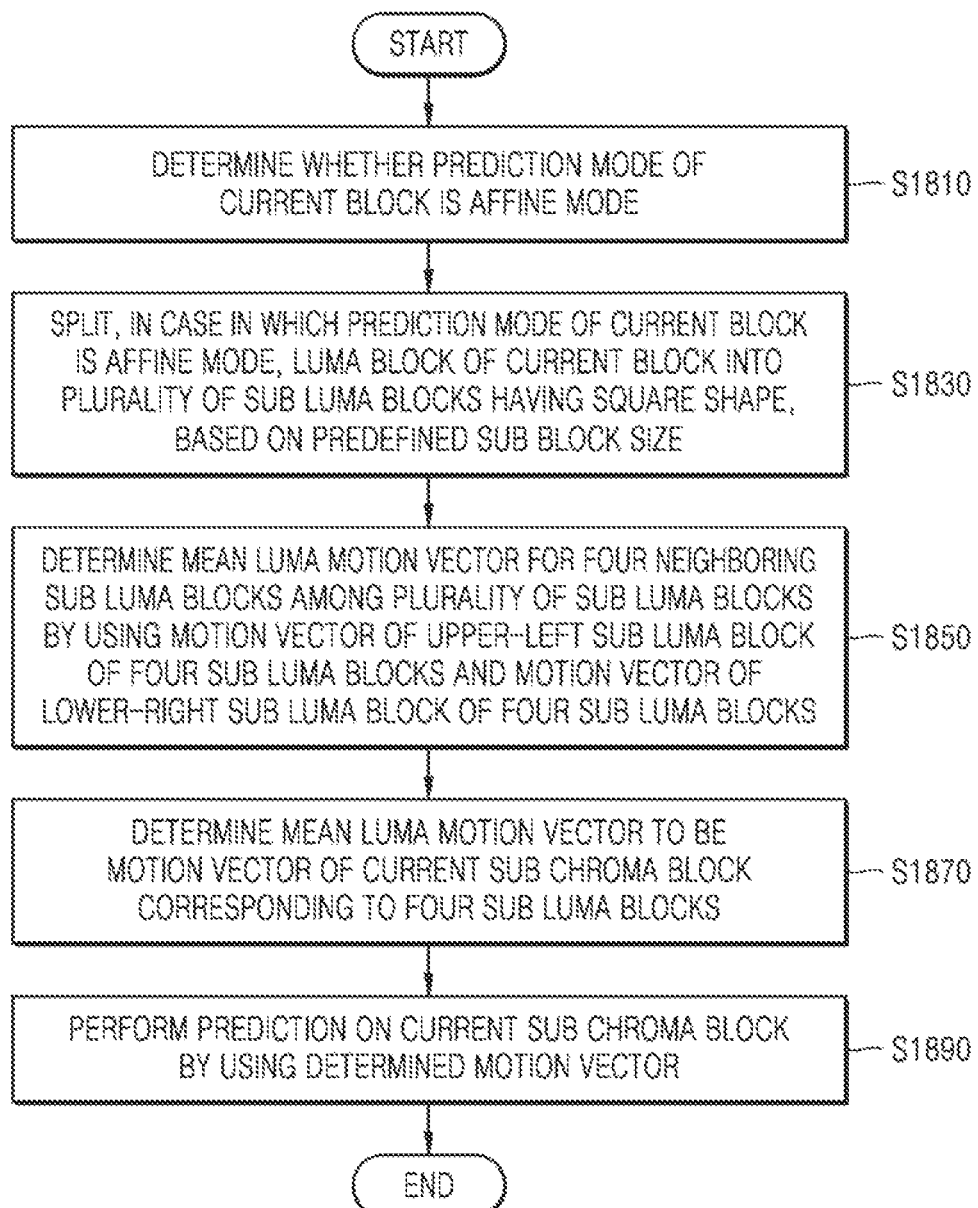
FIG. 18 illustrates a flowchart of a video encoding method according to an embodiment.

FIG. 18 is a flowchart illustrating a video encoding method according to an embodiment.

Referring to FIG. 18, in operation S1810, the video encoding device 1700 may determine whether a prediction mode of a current block is an affine mode.

In operation S1830, when the prediction mode of the current block is the affine mode, the video encoding device 1700 may split a luma block of the current block into a plurality of sub luma blocks having a square shape, based on a predefined sub block size.

In operation S1850, the video encoding device 1700 may determine a mean luma motion vector for four neighboring sub luma blocks among the plurality of sub luma blocks by using a motion vector of an upper-left sub luma block of the four sub luma blocks and a motion vector of a lower-right sub luma block of the four sub luma blocks.

In operation S1870, the video encoding device 1700 may determine the mean luma motion vector to be a motion vector of a current sub chroma block corresponding to the four sub luma blocks. A method of determining the mean luma motion vector by using the motion vector of the upper-left sub luma block of the four sub luma blocks and the motion vector of the lower-right sub luma block of the four sub luma blocks and determining the mean luma motion vector to be the motion vector of the sub chroma block corresponding to the four sub luma blocks will be described with reference to FIG. 21C, at a later time.

According to an embodiment, the motion vector of the current sub chroma block may be a mean value of the motion vector of the upper-left sub luma block and the motion vector of the lower-right sub luma block.

According to an embodiment, a chroma format of a current chroma image including the current sub chroma block may be 4:2:0.

According to an embodiment, the predefined sub block size may be 4×4.

According to an embodiment, when the predefined sub block size is 4×4, a size of the current sub chroma block may be 4×4.

According to another embodiment, a mean luma motion vector may be determined by using all motion vectors of four sub luma blocks having a square shape, and the mean luma motion vector may be determined to be a motion vector of a current sub chroma block corresponding to the four sub luma blocks. A method of determining the mean luma motion vector by using all the motion vectors of the four sub luma blocks and determining the mean luma motion vector to be the motion vector of the current sub chroma block corresponding to the four sub luma blocks will be described with reference to FIG. 21B, at a later time.

According to another embodiment, a mean luma motion vector may be determined by using only a motion vector of an upper-left sub luma block of four sub luma blocks having a square shape, and the mean luma motion vector may be determined to be a motion vector of a current sub chroma block corresponding to the four sub luma blocks. A method of determining the mean luma motion vector by using only the motion vector of the upper-left sub luma block among the motion vectors of the four sub luma blocks, and determining the mean luma motion vector to be a motion vector of a sub chroma block corresponding to the four sub luma blocks will be described with reference to FIG. 21D, at a later time.

In operation S1890, the video encoding device 1700 may perform prediction on the current sub chroma block by using the determined motion vector.

According to an embodiment, whether the prediction mode of the current block is the affine mode may be determined through a sum of transform difference (SATD) or rate distortion optimization (RDO) calculation, and information about whether the prediction mode of the current block is the affine mode may be encoded and signaled.

Figure 19:
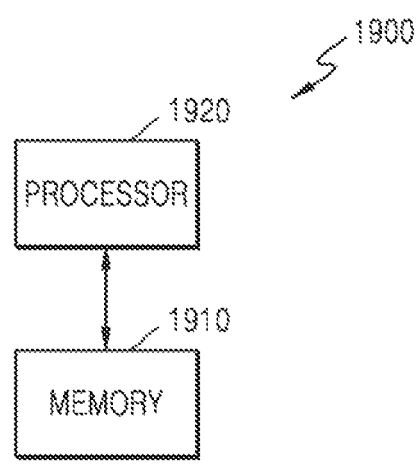
FIG. 19 illustrates a block diagram of a video decoding device according to an embodiment.
Figure 20:
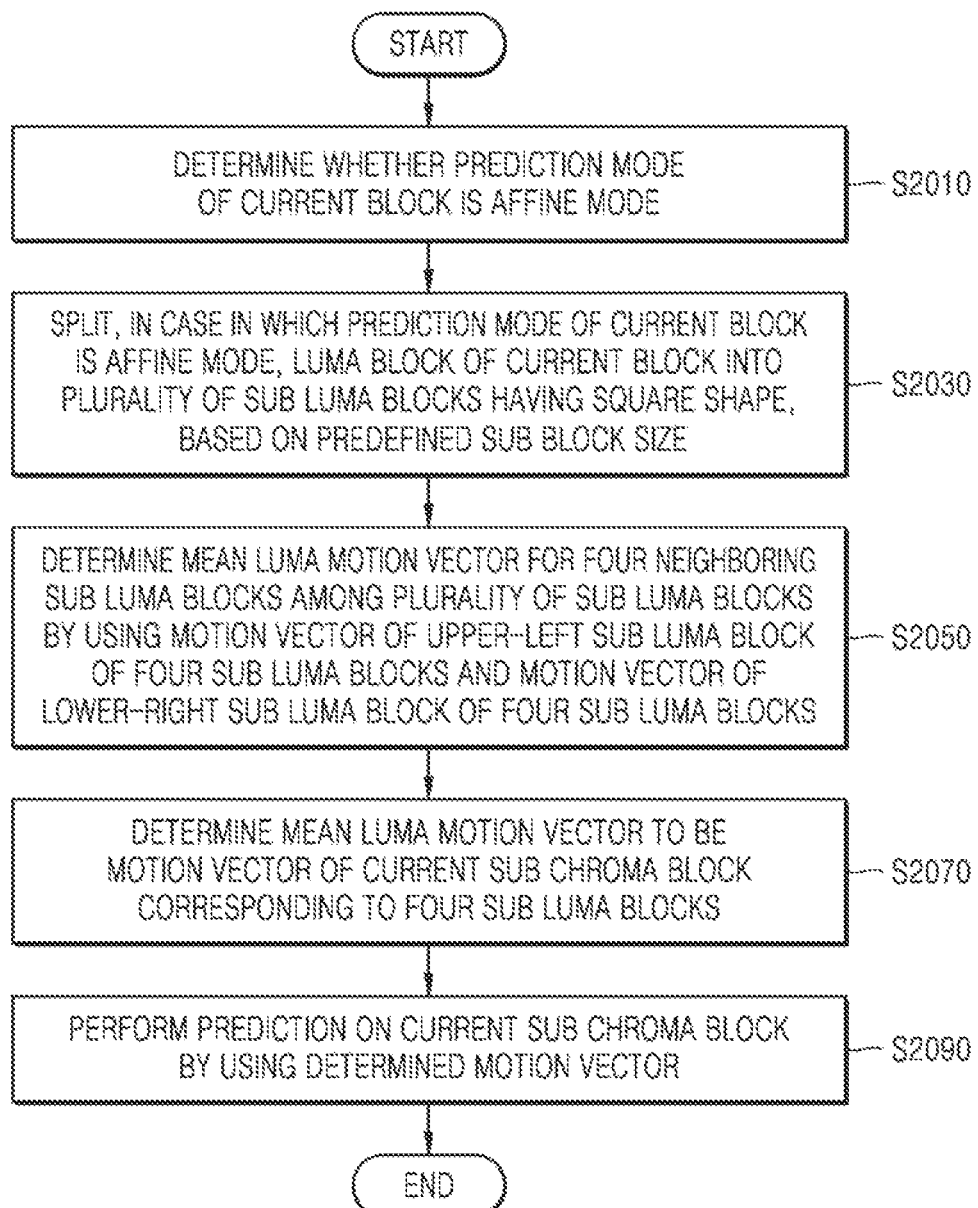
FIG. 20 illustrates a flowchart of a video decoding method according to an embodiment.

FIGS. 19 and 20 illustrate a block diagram of a video decoding device according to an embodiment and a flowchart of a video decoding method according to an embodiment, respectively corresponding to the video encoding device and the video encoding method described above.

FIG. 19 illustrates a block diagram of a video decoding device according to an embodiment.

A video decoding device 1900 according to an embodiment may include a memory 1910, and at least one processor 1920 connected to the memory 1910. Operations of the video decoding device 1900 according to an embodiment may be performed by individual processors or by a control by a central processor. Also, the memory 1910 of the video decoding device 1900 may store data received from outside, and data (for example, a motion vector of a sub luma block, etc.) generated by the processor 1920.

The processor 1920 of the video decoding device 1900 may determine whether a prediction mode of a current block is an affine mode, split, when the prediction mode of the current block is the affine mode, a luma block of the current block into a plurality of sub luma blocks having a square shape based on a predefined sub block size, determine a mean luma motion vector for four neighboring sub luma blocks among the plurality of sub luma blocks by using a motion vector of an upper-left sub luma block of the four sub luma blocks and a motion vector of a lower-right sub luma block of the four sub luma blocks, determine the mean luma motion vector to be a motion vector of a current sub chroma block corresponding to the four sub luma blocks, and perform prediction on the current sub chroma block by using the determined motion vector.

Hereinafter, detailed operations of a method of determining whether a prediction mode of a current block is an affine mode, splitting, when the prediction mode of the current block is the affine mode, a luma block of the current block into a plurality of sub luma blocks having a square shape based on a predefined sub block size, determining a mean luma motion vector for four neighboring sub luma blocks among the plurality of sub luma blocks by using a motion vector of an upper-left sub luma block of the four sub luma blocks and a motion vector of a lower-right sub luma block of the four sub luma blocks, determining the mean luma motion vector to be a motion vector of a current sub chroma block corresponding to the four sub luma blocks, and performing prediction on the current sub chroma block by using the determined motion vector will be described with reference to FIG. 20.

FIG. 20 is a flowchart illustrating a video decoding method according to an embodiment.

Referring to FIG. 20, in operation S2010, the video decoding device 1900 may determine whether a prediction mode of a current block is an affine mode.

In operation S2030, the video decoding device 1900 may split, when the prediction mode of the current block is the affine mode, a luma block of the current block into a plurality of sub luma blocks having a square shape based on a predefined sub block size.

In operation S2050, the video decoding device 1900 may determine a mean luma motion vector for four neighboring sub luma blocks among the plurality of sub luma blocks by using a motion vector of an upper-left sub luma block of the four sub luma blocks and a motion vector of a lower-right sub luma block of the four sub luma blocks.

In operation S2070, the video decoding device 1900 may determine the mean luma motion vector to be a motion vector of a current sub chroma block corresponding to the four sub luma blocks.

According to an embodiment, the motion vector of the current sub chroma block may be a mean value of the motion vector of the upper-left sub luma block and the motion vector of the lower-right block sub luma block.

According to an embodiment, a chroma format of a current chroma image including the current sub chroma block may be 4:2:0.

According to an embodiment, the predefined sub block size may be 4×4.

According to an embodiment, when the predefined sub block size is 4×4, a size of the current sub chroma block may be 4×4.

According to another embodiment, the mean luma motion vector may be determined by using all motion vectors of the four sub luma blocks having the a square shape, and the mean luma motion vector may be determined to be the motion vector of the current sub chroma block corresponding to the four sub luma blocks.

According to another embodiment, the mean luma motion vector may be determined by using only the motion vector of the upper-left sub luma block of the four sub luma blocks having the a square shape, and the mean luma motion vector may be determined to be the motion vector of the current sub chroma block corresponding to the four sub luma blocks.

In operation S2090, the video decoding device 1900 may perform prediction on the current sub chroma block by using the determined motion vector.

According to an embodiment, whether the prediction mode of the current block is the affine mode may be determined based on information about whether the prediction mode of the current block is the affine mode, the information having been determined and signaled during an encoding process.

Figure 21A:
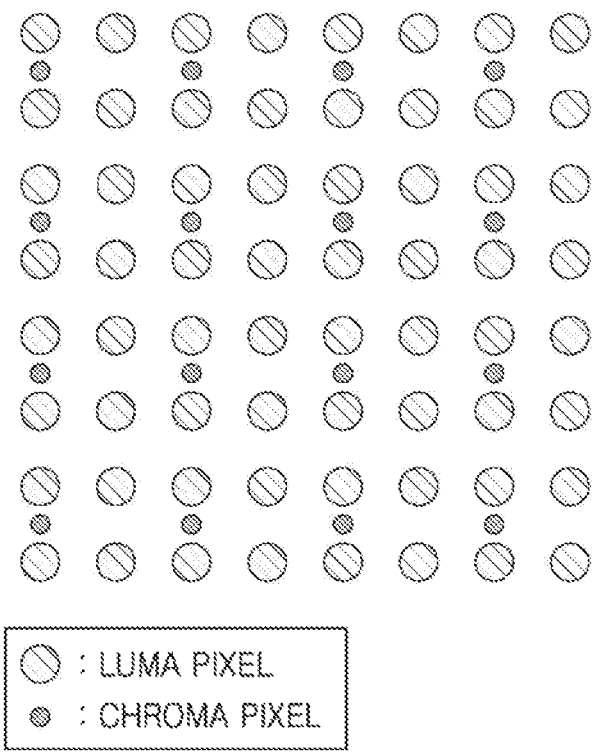
FIG. 21A is a view for illustrating luma pixels and chroma pixels when a color format is 4:2:0.

FIG. 21A illustrates luma pixels and chroma pixels when a color format is 4:2:0.

Referring to FIG. 21A, when a color format of a current image is 4:2:0, the number of chroma pixels corresponding to luma pixels of 8×8 may be 4×4. More specifically, four luma pixels may correspond to one chroma pixel, and each chroma pixel may be located at a middle position between an upper-left luma pixel and a lower-left luma pixel of four luma pixels forming a square shape. However, a position of each chroma pixel is not limited to the middle position, and each chroma pixel may be located at one of a position of the upper-left luma pixel, a position of a lower-left luma pixel, a middle position between the upper-left luma pixel and an upper-right luma pixel, a center position of the four luma pixels, and a middle position between the lower-left luma pixel and the lower-right luma pixel.

FIG. 21B is a view for describing a method of performing prediction on a sub chroma block corresponding to four sub luma blocks by using motion vectors of the four sub luma blocks.

Referring to FIG. 21B, a luma block 2100 having 8×8 luma pixels may be split into four sub luma blocks 2110, 2120, 2130, and 2140 each having 4×4 luma pixels in an affine mode, wherein the respective sub luma blocks 2110, 2120, 2130, and 2140 may have motion vectors MV1, MV2, MV3, and MV4, respectively, and the luma block 2100 may be subject to motion compensation in units of sub luma blocks. A motion vector of a sub chroma block corresponding to the four sub luma blocks 2110, 2120, 2130, and 2140 may be determined by using the motion vectors MV1, MV2, MV3, and MV4 of the four sub luma blocks 2110, 2120, 2130, and 2140 corresponding to the sub chroma block, and prediction on the sub chroma block may be performed by using the determined motion vector. The motion vector of the sub chroma block may be calculated as a mean value of the motion vectors MV1, MV2, MV3, and MV4 of the four sub luma blocks 2110, 2120, 2130, and 2140.

FIG. 21B illustrates an embodiment of a case in which a luma block is 8×8. However, a size of the luma block is not limited to 8×8. For example, when a luma block is a coding unit having a size of 128×128, the luma block may be split into units of 4×4 sub blocks, and split into 1024 sub luma blocks. Also, because a sub chroma block corresponds to four sub luma blocks, a chroma block may be split into 256 sub chroma blocks.

Equation 1 below represents an example of calculating a mean value of motion vectors.

$$Mv\ curMv = Mv1 + Mv2 + Mv3 + Mv4 + Mv(2,2);$$

$$curMv.\text{set}(curMv.\text{get}Hor(\ ) \gg 2, curMv.\text{get}Ver(\ ) \gg 2); \quad \text{[Equation 1]}$$

However, when a mean value is calculated by using Equation 1, a result of (3>>1) is 1, whereas a result of (−3)>>1 is −2. Therefore, rounding is asymmetric with respect to positive numbers and negative numbers.

For symmetric rounding, a mean value of motion vectors may be calculated by using Equation 2 below.

int rndOffset=2;

int rndShift=2;

curMv.setHor(curMv.getHor( )>=0?
((curMv.getHor( )+rndOffset)>>rndShift):−((−curMv.getHor( )+rndOffset)>>rndShift));

curMv.setVer(curMv.getVer( )>=0?
((curMv.getVer( )+rndOffset)>>rndShift):−((−curMv.getVer( )+rndOffset)>>rndShift));  [Equation 2]

Equation 2 applies different rounding methods according to whether a value to be rounded is a positive number or a negative number. For example, when A to be rounded is a positive value, A may be rounded to (A+offset)>>shift, and, when A to be rounded is a negative value, A may be rounded to −((−A+offset)>>shift). Herein, a relationship between offset and shift may be offset=(1<<(shift−1)). Also, a shift value may be determined based on the number of values to be rounded. For example, when a mean value of four values is obtained, a sum of the values may be rounded by using a shift value of 2, and, when a mean value of two values is obtained, a sum of the values may be rounded by using a shift value of 1.

Figure 21C:
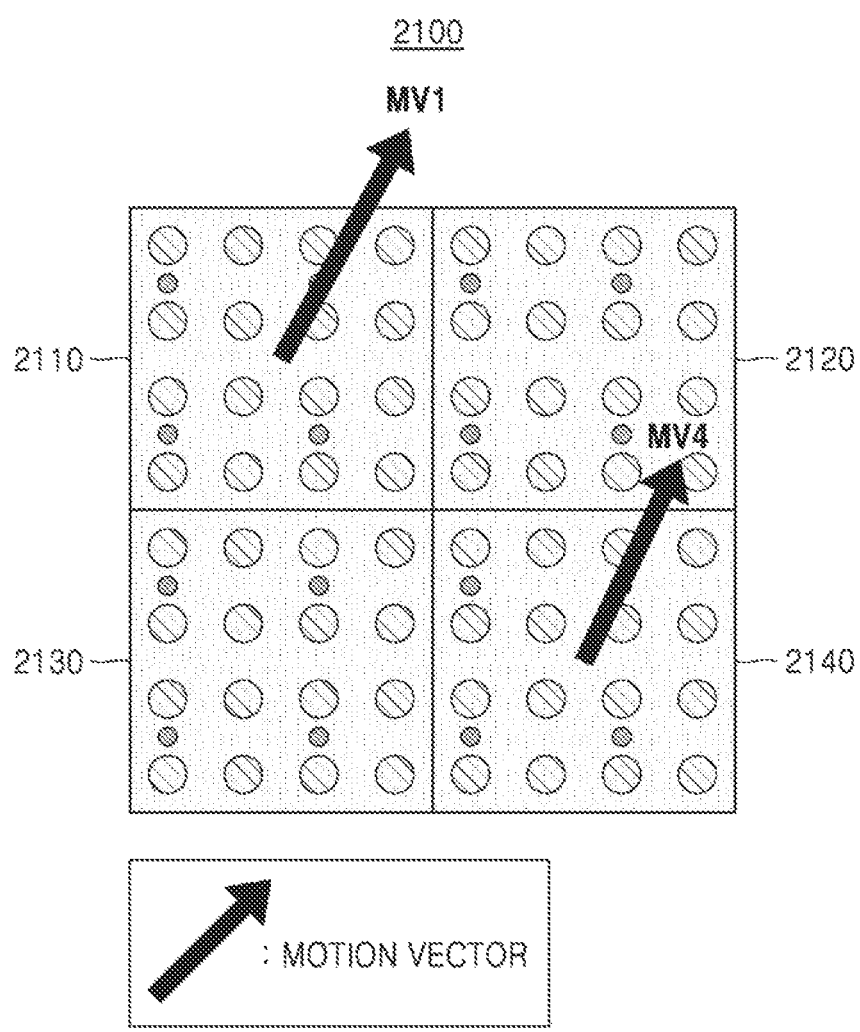
FIG. 21C is a view for describing a method of performing prediction on a sub chroma block corresponding to four sub luma blocks by using motion vectors of upper-left and lower-right sub luma blocks of the four sub luma blocks.

FIG. 21C is a view for describing a method of performing prediction on a sub chroma block corresponding to four sub luma blocks by using motion vectors of upper-left and lower-right sub luma blocks of the four sub luma blocks.

Referring to FIG. 21C, unlike FIG. 21B, a motion vector of a sub chroma block may be determined by using motion vectors of two sub luma blocks of four sub luma blocks. More specifically, the motion vector of the sub chroma block may be determined to be a mean value of a motion vector MV1 of an upper-left sub luma block 2110 of the four sub luma blocks and a motion vector MV4 of a lower-right sub luma block 2140 of the four sub luma blocks, and prediction on the sub chroma block may be performed by using the determined motion vector.

Figure 21D:
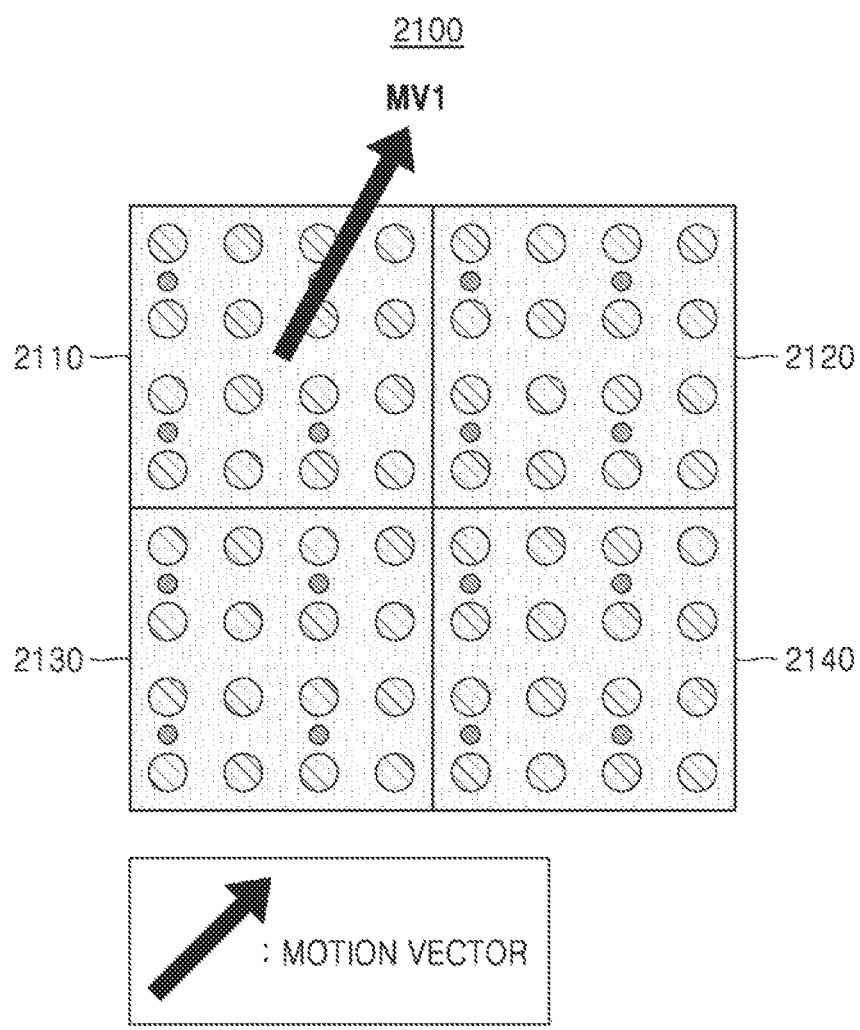
FIG. 21D is a view for describing a method of performing prediction on a sub chroma block corresponding to four sub luma blocks by using a motion vector of an upper-left sub luma block of the four sub luma blocks.

FIG. 21D is a view for describing a method of performing prediction on a sub chroma block corresponding to four sub luma blocks by using a motion vector of an upper-left sub luma block of the four sub luma blocks.

Referring to FIG. 21D, a motion vector of a sub luma block of four sub luma blocks may be determined to be a motion vector of a sub chroma block, as it is. More specifically, the motion vector of the sub chroma block may be determined to be a motion vector MV1 of an upper-left sub luma block 2110 of the four sub luma blocks, and prediction on the sub chroma block may be performed by using the determined motion vector.

According to another embodiment, when a size of a sub chroma block is 4×4 in an affine mode, a representative motion vector may be used for a rectangular sub chroma block configured with regular sub chroma blocks. A width and height of a chroma block having a representative motion vector may be based on a width and height of a current coding unit.

According to another embodiment, when a size of a sub chroma block is 4×4 in an affine mode, a representative motion vector may be used for a rectangular sub chroma block configured with regular sub chroma blocks. A width and height of a chroma block having a representative motion vector may be signaled at a slice level. Also, a width and height of a chroma block having a representative motion vector may be derived based on a control point motion vector (CPMV) of a current block.

According to another embodiment, when a size of a sub chroma block is 4×4 in an affine mode, a representative motion vector may be used for a square chroma block configured with regular sub chroma blocks. A width and height of a chroma block having a representative motion vector may be signaled at a slice level. Also, a width and height of a chroma block having a representative motion vector may be derived based on a CPMV of a current block. Also, a width and height of a chroma block having a representative motion vector may be determined based on a size of a coding unit. The size of the coding unit may be fixed. For example, the coding unit may have an 8×8 pixel size.

Figure 22:
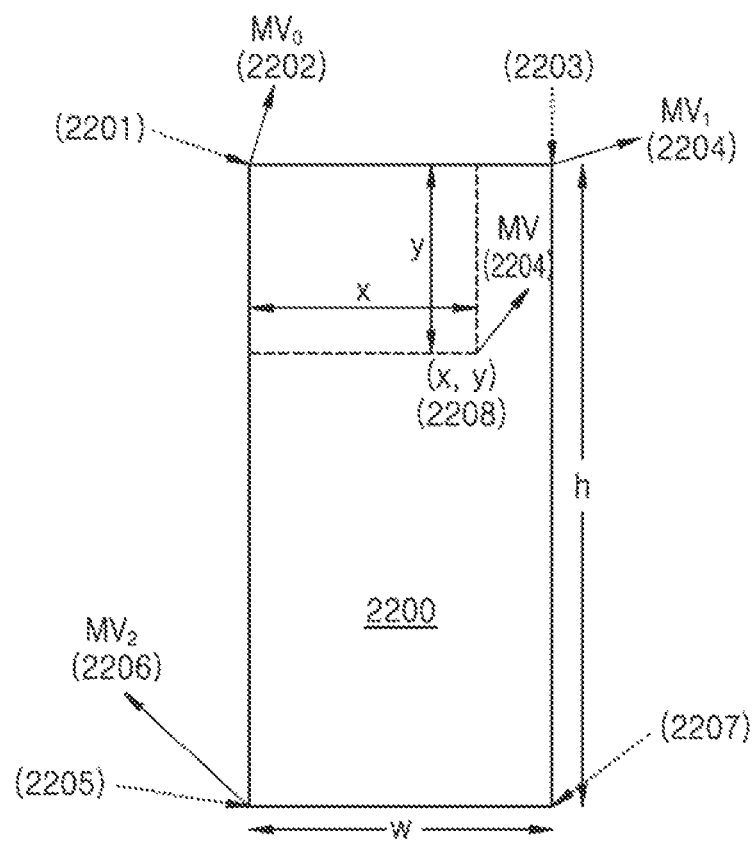
FIG. 22 is a view for detailedly describing a method of deriving a motion vector to be applied to a sample of a current block in an affine mode.

FIG. 22 is a view for detailedly describing a method of deriving a motion vector to be applied to a sample of a current block in an affine mode.

To derive a motion vector of a sample of a current block 2200 in an affine mode, at least three or more affine parameters may be needed. More specifically, an affine mode may include a 6-parameter affine mode, a 4-parameter affine mode, and a 3-parameter affine mode. Hereinafter, a method of deriving the motion vector of the sample of the current block 2200 according to each of the affine modes will be described.

In the 6-parameter affine mode, the processor 1710 may obtain three motion vectors 2202, 2204, and 2206 from neighboring samples of the current block 2200. The first motion vector 2202 may be obtained from the neighboring samples adjacent to upper-left coordinates 2201 of the current block 2200. Also, the second motion vector 2204 may be obtained from the neighboring samples adjacent to upper-right coordinates 2203 of the current block 2200. Also, the third motion vector 2206 may be obtained from the neighboring samples adjacent to lower-left coordinates 2205 of the current block 2200. In FIG. 22, the third motion vector 2206 is obtained based on the lower-left coordinates 2205 of the current block 2200, however, according to some embodiments, the third motion vector 2206 may be obtained based on lower-right coordinates 2207 of the current block 2200. Also, the processor 1710 may determine x and y components of the first motion vector 2202, x and y components of the second motion vector 2204, and x and y components of the third motion vector 2206, as affine parameters.

According to an embodiment, the first motion vector 2202 may be determined to be a mean value of motion vectors of a plurality of neighboring blocks adjacent to the upper-left coordinates 2201 of the current block 2200. Likewise, the second motion vector 2204 may be determined to be a mean value of motion vectors of a plurality of neighboring blocks adjacent to the upper-right coordinates 2203 of the current block 2200. Also, the third motion vector 2206 may be determined to be a mean value of motion vectors of a plurality of neighboring blocks adjacent to the lower-left coordinates 2205 of the current block 2200 or the lower-right coordinates 2207 of the current block 2200.

A motion vector 2210 of a sample 2208 of the current block 2200 may be determined based on the first motion vector 2202, the second motion vector 2204, and the third motion vector 2206, according to Equations 3 to 5.

In Equations 3 to 5, x represents a horizontal distance between the upper-left coordinates 2201 of the current block 2200 and the sample 2208 of the current block 2200, and y represents a vertical distance between the upper-left coordinates 2201 of the current block 2200 and the sample 2208 of the current block 2200. MV0 represents the first motion vector 2202, MV1 represents the second motion vector 2204, and MV2 represents the third motion vector 2206. MV represents the motion vector 2210 of the sample 2208 of the current block 2200. w represents a width of the current block 2200, and h represents a height of the current block 2200. dMVx represents a rate of horizontal change of the motion vector 2210, and dMVy represents a rate of vertical change of the motion vector 2210.

$$dMVx=(MV1-MV0)/w \qquad \text{[Equation 3]}$$

$$dMVy=(MV2-MV0)/h \qquad \text{[Equation 4]}$$

$$MV=MV0+x \cdot dMVx+y \cdot dMVy \qquad \text{[Equation 5]}$$

Equation 3 represents a method of obtaining a rate-of-horizontal change dMVx of the motion vector 2210. According to Equation 3, a value obtained by dividing a value resulting from subtracting the first motion vector 2202 from the second motion vector 2204 by the width of the current block 2200 may be determined to be a rate of horizontal change of the motion vector 2210.

Equation 4 represents a method of obtaining a rate-of-vertical change dMVy of the motion vector 2210. According to Equation 4, a value obtained by dividing a value resulting from subtracting the first motion vector 2202 from the third motion vector 2206 by the height of the current block 2200 may be determined to be a rate of horizontal change of the motion vector 2210.

Equation 5 represents a method of obtaining the motion vector 2210. According to Equation 5, the motion vector 2210 may be determined to be a value obtained by summing the first motion vector (MV0) 2202 with an inner product of (x, y), which are coordinates of the sample 2208 of the current block 2200 with respect to the upper-left coordinates 2201 of the current block 2200, and (dMVx, dMVy) representing a rate-of-vertical change and a rate-of-horizontal change.

According to Equations 3 to 5, motion vectors of sub blocks or all samples included in the current block 2200 may be determined. According to Equations 3 to 5, a motion vector of a sample may depend on a position of the sample. Equations 3 and 4 may be applied to a case in which coordinates from which the first motion vector 2202 and the second motion vector 2204 are extracted have the same vertical component and coordinates from which the first motion vector 2202 and the third motion vector 2206 are extracted have the same horizontal component. Accordingly, a generalized equation for determining a motion vector of the current block 2200 will be described with reference to FIG. 29, at a later time.

In the 6-parameter affine mode, the motion vector 2210 may be determined by three motion vectors, and a reference block of the current block 2200 may be zoomed, rotated, or sheared from the current block 2200.

In the 4-parameter affine mode, the processor 1710 may obtain the two motion vectors 2202 and 2204 from neighboring samples of the current block 2200. As in the 6-parameter affine mode, the first motion vector 2202 may be obtained from the neighboring samples adjacent to the upper-left coordinates of the current block 2200. Likewise, the second motion vector 2204 may be obtained from the neighboring samples adjacent to the upper-right coordinates of the current block 2200. Also, the processor 1710 may determine x and y components of the first motion vector 2202 and x and y components of the second motion vector 2204 to be affine parameters.

In the 4-parameter affine mode, the third motion vector 2206 may be determined by combining the first motion vector 2202 with the second motion vector 2204, instead of being determined from the lower-left or lower-right coordinates of the current block 2200. Equations 6 and 7 represent a method of determining the third motion vector 2206 by combining the first motion vector 2202 with the second motion vector 2204. In Equations 6 and 7, x represents a horizontal component of a motion vector, and y represents a vertical component of a motion vector. MV0 represents the first motion vector 2202, MV1 represents the second motion vector 2204, and MV2 represents the third motion vector 2206. w represents the width of the current block 2200, and h represents the height of the current block 2200.

$$MV2[x]=(MV1[y]-MV0[y])*w/h+MV0[x] \qquad \text{[Equation 6]}$$

$$MV2[y]=(MV0[x]-MV1[x])*w/h+MV0[y] \qquad \text{[Equation 7]}$$

According to Equation 6, a horizontal coordinate value MV2[x] of the third motion vector 2206 may be determined to be a value (MV1[y]−MV0[y])*w/h+MV0[x] obtained by summing a horizontal coordinate value MV0[x] of the first motion vector 2202 with a product of a value (MV1[y]−MV0[y]) resulting from subtracting a vertical coordinate value of the first motion vector 2202 from a vertical coordinate value of the second motion vector 2204 and a value w/h resulting from dividing the width of the current block 2200 by the height of the current block 2200.

According to Equation 7, a vertical coordinate value MV2[y] of the third motion vector 2206 may be determined to be a value (MV0[x]−MV1[x])*w/h+MV0[y] obtained by summing a vertical coordinate value MV0[y] of the first motion vector 2202 with a product of a value (MV0[x]−MV1[x]) resulting from subtracting a horizontal coordinate value of the second motion vector 2204 from a horizontal coordinate value of the first motion vector 2202 and the value w/h resulting from dividing the width of the current block 2200 by the height of the current block 2200.

In the 4-parameter affine mode, x and y components of the third motion vector 2206 may be derived from the first motion vector 2202 and the second motion vector 2204. Accordingly, unlike the 6-parameter affine mode, in the 4-parameter affine mode, a reference block of the current block 2200 may be zoomed or rotated from the current block 2200 based on the first motion vector 2202 and the second motion vector 2204. That is, in the 4-parameter affine mode, the current block 2200 may not be sheared.

In the 3-parameter affine mode, the processor 1710 may obtain the two motion vectors 2202 and 2204 from the neighboring samples of the current block 2200. The first motion vector 2202 may be obtained from the neighboring samples adjacent to the upper-left coordinates of the current block 2200. Likewise, the second motion vector 2204 may be obtained from the neighboring samples adjacent to the upper-right coordinates of the current block 2200. However, unlike the 4-parameter affine mode, in the 3-parameter affine mode, only an x or y component may be obtained from the second motion vector 2204. Therefore, the processor 1710 may determine the x or y component of the second motion vector 2204, together with the x and y components of the first motion vector 2202, to be affine parameters.

When the x component of the second motion vector 2204 is obtainable, the y component of the second motion vector 2204 may be obtained from the y component of the first motion vector 2202. In contrast, when the y component of the second motion vector 2204 is obtainable, the x component of the second motion vector 2204 may be obtained from the x and y components of the first motion vector 2202 and the y component of the second motion vector 2204. Equations 8 and 9 below represent a method of determining the y and x components of the second motion vector 2204.

In Equations 8 and 9, x represents a horizontal component of a motion vector, and y represents a vertical component of a motion vector. MV0 represents the first motion vector 2202, MV1 represents the second motion vector 2204, and MV2 represents the third motion vector 2206. w represents the width of the current block 2200, and h represents the height of the current block 2200.

$$MV1[y]=MV0[y] \quad \text{[Equation 8]}$$

$$MV1[x]=\text{sqrt}(w2-(MV1[y]-MV0[y])2)+MV0[x]-w \quad \text{[Equation 9]}$$

According to Equation 8, when only the x component of the second motion vector 2204 is obtainable, the processor 1710 may determine the y component of the second motion vector 2204 to be identical to the y component of the first motion vector 2202.

According to Equation 9, when only the y component of the second motion vector 2204 is obtainable, the processor 1710 may determine the x component of the second motion vector 2204 according to the x and y components MV0[x] and MV0[y] of the first motion vector 2202 and the y component MV1[y] of the second motion vector 2204.

Also, the x and y components of the third motion vector 2206 may be determined according to Equations 6 and 7, as in the 4-parameter affine mode. In the 3-parameter affine mode, a component(s) that is not obtainable among the x and y components of the second motion vector 2204, together with the third motion vector 2206, may be derived from a component(s) that is obtainable among the x and y components of the first motion vector 2202 and the second motion vector 2204. Accordingly, in the 3-parameter affine mode, a reference block of the current block 2200 may be only zoomed or rotated from the current block 2200, based on the first motion vector 2202 and the second motion vector 2204. When the x component of the second motion vector 2204 is obtainable, a reference block of the current block 2200 may be only zoomed from the current block 2200. In contrast, when the y component of the second motion vector 2204 is obtainable, a reference block of the current block 2200 may be only rotated from the current block 2200.

Figure 23:
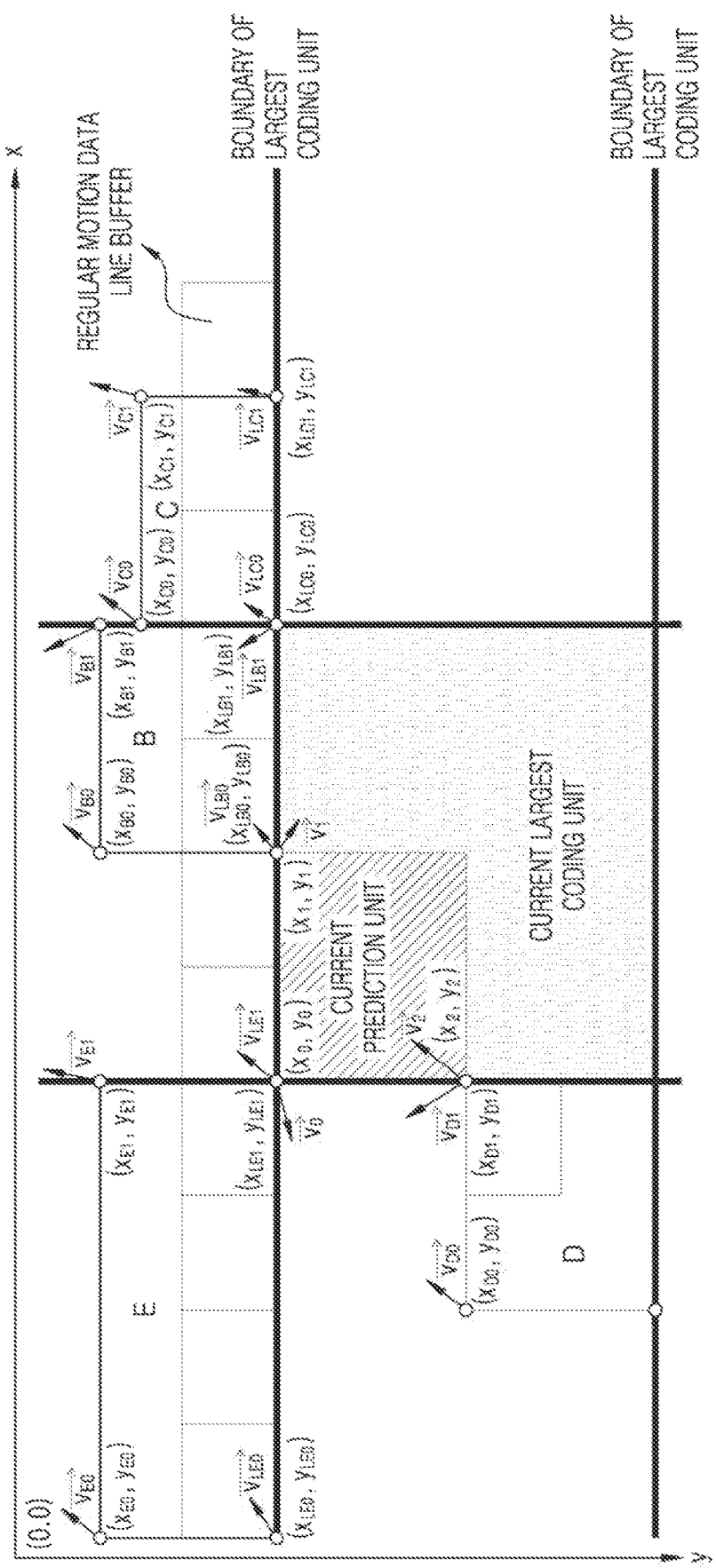
FIG. 23 is a view for describing a method of deriving parameters of an affine mode in a coding unit bordering on an upper boundary of a largest coding unit.

FIG. 23 is a view for describing a method of deriving control point motion vectors of an affine mode in a coding unit bordering on an upper boundary of a largest coding unit. Herein, a 'control point motion vector' means an affine parameter that is used in the affine mode.

Referring to FIG. 23, to reduce additional line buffer requirements, when a current coding unit is located at an upper portion of a largest coding unit, a 4-parameter model may be inherited from upper coding units of the current coding unit. This method may cause loss of 0.1%.

More specifically, as affine mode parameters of a current prediction unit included in a current largest coding unit and bordering on an upper boundary line of the current largest coding unit, 6 or 4 parameters may be inherited from a left prediction unit D, whereas, in prediction units E, B, and C located above the upper boundary line of the current largest coding unit, a 4-parameter model and lower-left and lower-right control point motion vectors (for example, vectors $V_{LE0}$ and $V_{LE1}$) may be, when a regular motion data line buffer amount is reduced, used to inherit affine motion data of the current prediction unit. That is, when a current prediction unit borders on an upper boundary line of a largest coding unit, a 4-parameter model of an upper prediction unit of the current prediction unit and lower-left and lower-right control point motion vectors of the upper prediction unit may be inherited, regardless of whether the current prediction unit is a 4-parameter model or a 6-parameter model. In other words, upper-left and upper-right control point motion vectors of the prediction units E, B, and C located above the upper boundary line of the current largest coding unit may be not used because the upper-left and upper-right control point motion vectors are not stored in the regular motion data line buffer, and the lower-left and lower-right control point motion vectors of the prediction units E, B, and C may be used because the lower-left and lower-right control point motion vectors are stored in the regular motion data line buffer.

According to another embodiment, when a current coding unit borders on an upper boundary line of a current largest coding unit, inheriting and deriving an affine parameter model from an upper coding unit may be limited, and a pre-defined, constructed affine model may be used.

According to another embodiment, when a current coding unit borders on an upper boundary line of a current largest coding unit, inheriting and deriving an affine parameter model from an upper coding unit may be limited when the upper coding unit uses a 6-parameter model, and considering the upper coding unit as a regular coding unit and inheriting and deriving a 4-parameter inheritance model may be allowed when the upper coding unit uses a 4-parameter model.

Figure 24:
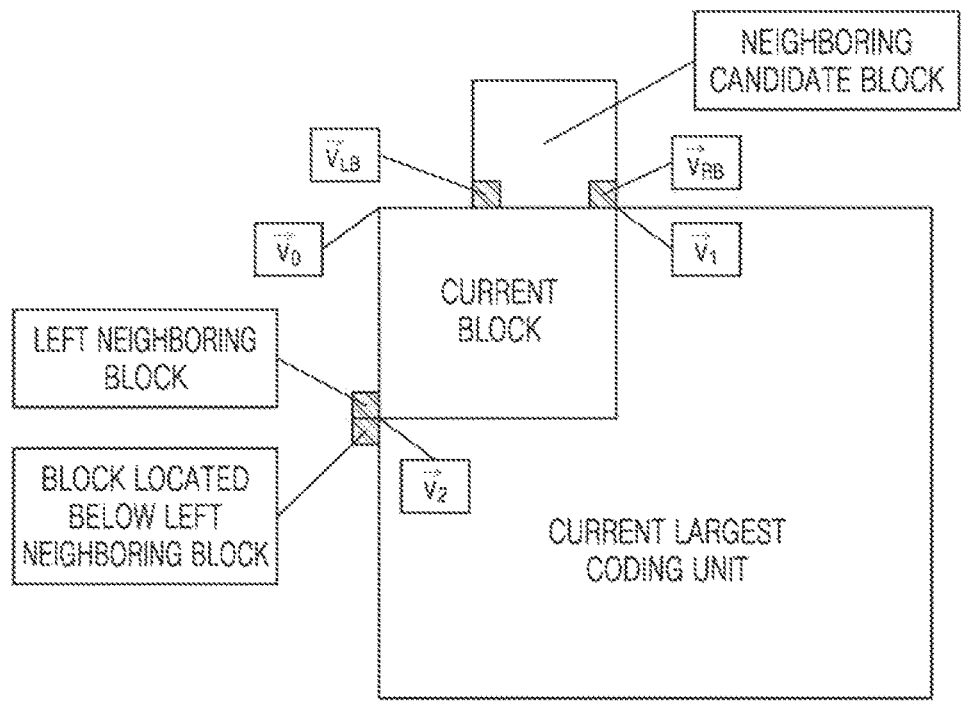
FIG. 24 is a view for describing a method of deriving parameters of an affine mode from neighboring blocks.

FIG. 24 is a view for describing a method of deriving control point motion vectors of an affine mode from neighboring blocks.

Referring to FIG. 24, two control point motion vectors $V_0$ and $V_1$ of a current block may be inherited from an upper neighboring candidate block of the current block, and a control point motion vector $V_2$ of the current block may be derived from a left neighboring block of the current block or a block located below the left neighboring block. For example, the control point motion vector $V_2$ may be derived by using a history-based motion vector prediction candidate list in which positions of 4×4 sub blocks are stored together with motion information. That is, the control point motion vector $V_2$ may be derived by using motion information of the left neighboring block or the block located below the left neighboring block, stored in the history-based motion vector prediction candidate list.

Herein, the history-based motion vector prediction (HMVP) may be motion information of previously encoded blocks or previously reconstructed blocks, stored as HMVP candidates. More specifically, a look-up table in which HMVP candidates are stored, that is, a HMVP list may be loaded, and a block may be encoded or reconstructed based on the HMVP candidates of the HMVP list.

An index of a most recently stored HMVP candidate among N HMVP candidates stored in a HMVP look-up table may be 0, and an index of a most previously stored HMVP candidate may be N−1. HMVP candidates may be searched from the HMVP candidate having the index N−1 to the HMVP candidate having the index 0, according to a circulation order of the HMVP look-up table.

Also, when a HMVP list is updated and a new HMVP candidate is added, motion information of a most previously stored HMVP candidate HMVP0 of candidates stored in the HMVP list may be removed. That is, the HMVP list may be updated according to a first in first out (FIFO) logic.

Figure 25:
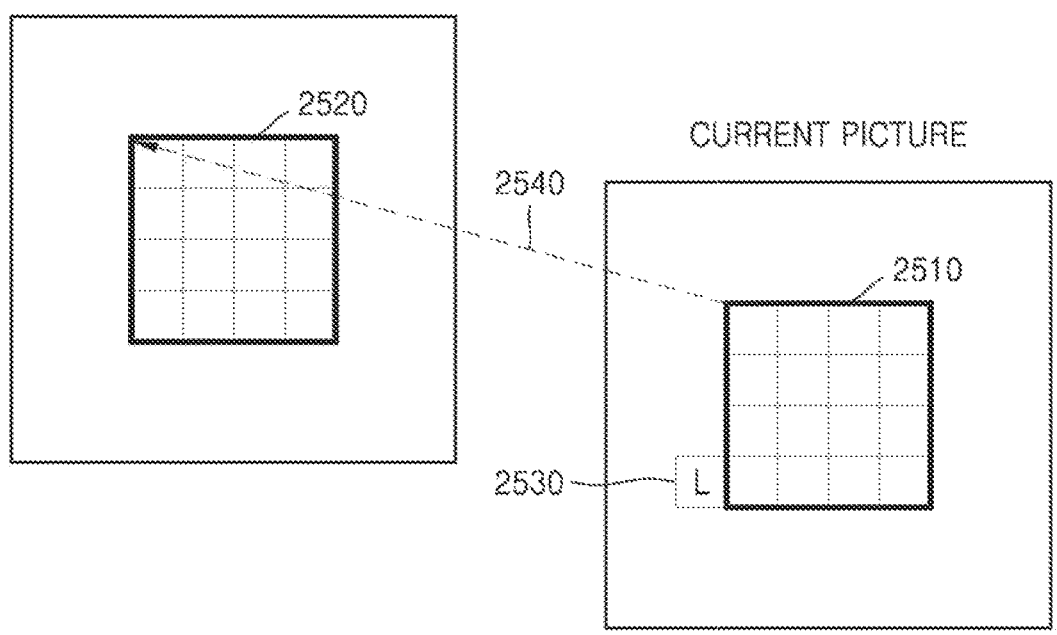
FIG. 25 illustrates a process of determining temporal motion vector candidates for sub block units.

FIG. 25 illustrates a process of determining temporal motion vectors candidate for sub block units.

Referring to FIG. 25, to determine temporal motion vector candidates (or, Alternative Temporal Motion Vector Predictors (ATMVPs)) for sub block units, whether a prediction mode of a left neighboring block 2530 of a current block 2510 of a current picture is an intra prediction mode or an inter prediction mode may be first determined. When the prediction mode of the left neighboring block 2530 is an inter prediction mode and a reference picture of the left neighboring block 2530 is identical to a collocated picture of the current block 2510, a temporal motion vector 2540 may be determined to be a motion vector of the left neighboring block 2530. That is, when the left neighboring block 2530 is an inter prediction mode and the left neighboring block 2530 has the same reference index as the collocated picture of the current block 2510, the temporal motion vector 2540 may be determined to be the motion vector of the left neighboring block 2530. Then, it is determined whether a motion vector corresponding to a center of a reference block 2520 corresponding to the current block 2510 exists in the reference picture (or a collocated picture) of the left neighboring block 2530 indicated by the temporal motion vector 2540. When the motion vector corresponding to the center of the reference block 2520 exists, a motion vector of sub blocks of the reference block 2520, corresponding to sub blocks (that is, 16 sub blocks) of the current block 2510, may be determined to be a temporal motion vector for a sub block unit. Thereafter, motion compensation for the current block 2510 may be performed based on the determined temporal motion vector for the sub block unit.

Referring again to FIG. 25, in the case which the reference picture of the left neighboring block 2530 is not identical to the collocated picture of the current block 2510 although the prediction mode of the left neighboring block 2530 is an intra prediction mode or an inter prediction mode, the temporal motion vector 2540 may be determined to be a zero motion vector. When a motion vector corresponding to a center of a block indicated by the zero motion vector exists, a motion vector of sub blocks of the block indicated by the zero motion vector may be determined to be a temporal motion vector for a sub block unit.

Also, when the prediction mode of the left neighboring block 2530 is an inter prediction mode and the left neighboring block 2530 has the same reference index as the collocated picture of the current block 2510 so that the temporal motion vector 2540 is determined to be a motion vector of the left neighboring block 2530, a motion vector corresponding to the center of the reference block 2520 corresponding to the current block 2510 may not exist in the reference picture (or a collocated picture) of the left neighboring block 2530 indicated by the temporal motion vector 2540. In this case, it may be determined that a temporal motion vector candidate for a sub block unit does not exist.

Also, when a temporal motion vector is determined to be a zero motion vector, no motion vector corresponding to a center of a block indicated by the zero motion vector may exist. In this case, it may be determined that a temporal motion vector candidate for a sub block unit does not exist.

Also, when the prediction mode of the left neighboring block 2530 is an inter prediction mode, the reference picture of the left neighboring block 2530 is determined to be identical to the collocated picture of the current block 2510, a motion vector corresponding to the center of the reference block 2520 exists, and no motion vector of the sub blocks of the reference block 2520 exists, the motion vector corresponding to the center of the reference block 2520 may be used as a default vector that may be determined to be a motion vector of the sub blocks of the current block 2510. That is, the default vector may be determined to be a temporal motion vector for a sub block unit. Thereafter, motion compensation for the current block 2510 may be performed based on the determined temporal motion vector for the sub block unit.

According to another embodiment, two ATMVP candidates may be used. More specifically, two motion vectors first scanned according to a scanning order may be determined to be two temporal motion vectors, and two ATMVP candidates may be determined by the two temporal motion vectors.

According to another embodiment, two ATMVP candidates may be determined. More specifically, by using two temporal motion vectors, ATMVP candidates may be determined by the respective temporal motion vectors.

According to another embodiment, to obtain a position of the collocated picture corresponding to the current block 2510, two or more temporal motion vectors may be selected. More specifically, a temporal motion vector indicated by another neighboring block of the current block 2510, in addition to a temporal motion vector indicated by the left neighboring block 2530 of the current block 2510, may be additionally selected. Also, when two or more temporal motion vectors are selected, the temporal motion vectors may be pruned with respect to each other, in order to remove the probability of overlapping ATMVP candidates. When one of temporal motion vectors overlaps, an ATMVP candidate corresponding to the overlapping temporal motion vector may be not used.

According to another embodiment, two or more temporal motion vectors may be selected to obtain a position of the collocated picture corresponding to the current block 2510. More specifically, a temporal motion vector indicated by another neighboring block of the current block 2510, in addition to a temporal motion vector indicated by the left neighboring block 2530 of the current block 2510, may be additionally selected. Also, two temporal motion vectors may be selected from neighboring blocks of the current block 2510 such that the two temporal motion vectors are as different from each other as possible, and various metrics may be used to check how the temporal motion vectors are different from each other. For example, when motion vectors are scalable such that the motion vectors indicate the same reference index, the corresponding temporal motion vectors may be pruned. Also, a distance L1 or L2 between positions indicated by two temporal motion vectors may be calculated, and when the distance L1 or L2 is smaller than a predefined value, one of the two temporal motion vectors may be pruned. Herein, L1 or L2 means a Norm to measure a distance between the two temporal motion vectors.

Figure 26A:
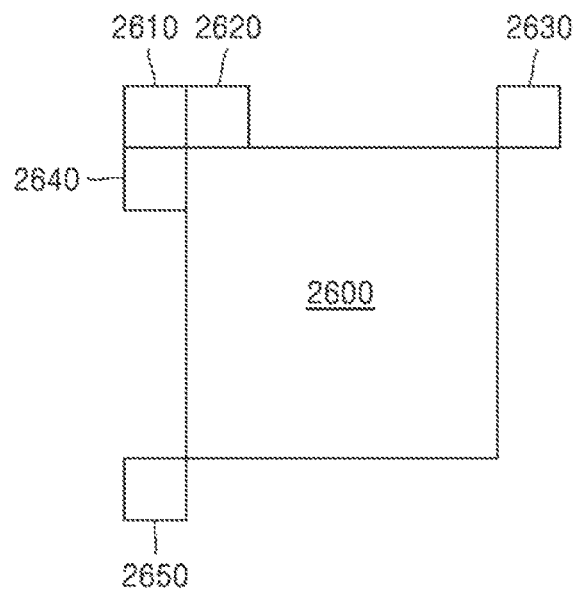
FIG. 26A is a view for describing affine inherited candidates in an affine merge candidate list.
Figure 26B:
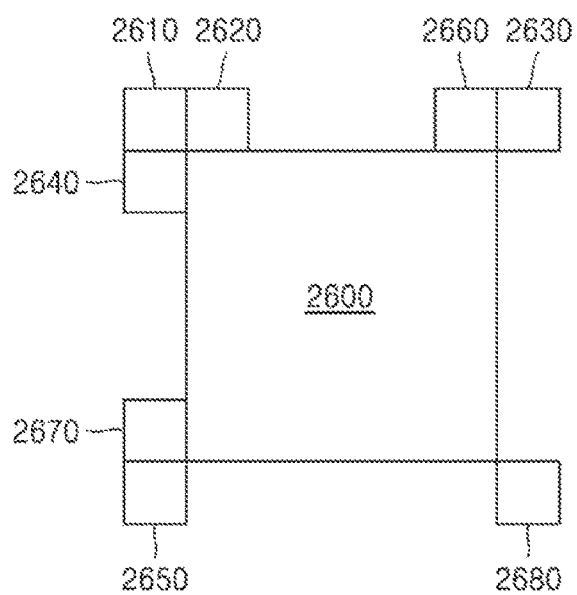
FIG. 26B is a view for describing affine constructed candidates in the affine merge candidate list.

FIG. 26A is a view for describing affine inherited candidates in an affine merge candidate list, and FIG. 26B is a view for describing affine constructed candidates in the affine merge candidate list.

In an affine merge candidate list of an affine mode, a temporal motion vector candidate of a sub block unit may be first added, 5 inherited candidates may be added, 6 constructed candidates may be added, and a zero motion vector candidate may be added.

Referring to FIG. 26A, when a prediction mode of a current block 2600 is an affine merge mode, positions of 5 inherited candidates of an affine merge candidate list of the affine merge mode may be a lower-left neighboring block 2650, upper-left neighboring blocks 2610, 2620, and 2640, and an upper-right neighboring block 2630 of the current block 2600. More specifically, a control point motion vector of one block among the five neighboring blocks 2650, 2610, 2620, 2640, and 2630 may be inherited and used as a control point motion vector of the current block 2600.

Referring to FIG. 26B, when the prediction mode of the current block 2600 is the affine merge mode, 6 constructed candidates of an affine merge candidate list of the affine merge mode may be determined from lower-left neighboring blocks 2650 and 2670, the upper-left neighboring blocks 2610, 2620, and 2640, upper-right neighboring blocks 2630 and 2660, and a temporal neighboring block 2680 of the current block 2600. For example, a control point motion vector located at an upper-left corner of the current block 2600 may be derived from the neighboring blocks 2610, 2620, and 2640 located to the upper-left side of the current block 2600, a control point motion vector located at a lower-left corner of the current block 2600 may be derived from the neighboring blocks 2650 and 2670 located to the lower-left side of the current block 2600, a control point motion vector located at an upper-right corner of the current block 2600 may be derived from the neighboring blocks 2630 and 2660 located to the upper-right side of the current block 2600, and a control point motion vector located at an upper-right corner of the current block 2600 may be derived from the temporal neighboring block 2680. The 6 constructed candidates of the affine merge candidate list may represent combinations of the control point motion vectors. More specifically, a combination of control point motion vectors of a upper-left side LT, a upper-right side RT, and a lower-left side LB of the current block 2600, a combination of control point motion vectors of the upper-left side LT, the upper-right side RT, and a lower-right side RB of the current block 2600, a combination of control point motion vectors of the upper-left side LT, the lower-left side LB, and the lower-right side RB of the current block 2600, a combination of control point motion vectors of the upper-right side RT, the lower-left side LB, and the lower-right side RB of the current block 2600, a combination of control point motion vectors of the upper-left side LT and the upper-right side RT of the current block 2600, and a combination of control point motion vectors of the upper-left side LT and the lower-left side LB of the current block 2600 may be the 6 constructed candidates of the affine merge candidate list.

According to an embodiment, when a temporal motion vector candidate for a sub block unit is used in an affine merge candidate list, a temporal motion vector candidate of a regular merge candidate may be limited, because a regular temporal motion vector candidate in a merge list does not provide a great gain.

According to an embodiment, the affine merge candidate list may use a padded candidate which is a zero-motion vector candidate. Also, an affine AMVP candidate list may use padded candidates generated by using a control point motion vector which is a first candidate of an affine AMVP candidate list. That is, all control point motion vectors of a first padded candidate may be identical to a control point motion vector of a left-upper side of the first padded candidate, and all control point motion vectors of a second padded candidate may be identical to a control point motion vector of an upper-right side of the first padded candidate. A method of generating padding candidates in an affine AMVP candidate list may be used to generate padded candidates of affine merge. In contrast, a method of generating padded candidates in an affine merge candidate list by using a zero motion vector may be used to generate padded candidates in an affine AMVP candidate list.

Referring to FIGS. 26A and 26B, positions of neighboring blocks used to generate the affine constructed candidates and affine inherited candidates may be not exactly the same. In the case of generating affine constructed candidates and affine inherited candidates, the same group of positions of neighboring blocks may be checked. The reason may be to consistentize a design and simplify a deriving process.

According to an embodiment, when one of corner positions cannot be used in a process of deriving affine constructed candidates or affine merge candidates existing in an affine merge candidate list or an affine AMVP candidate list, a center position of the corresponding edge may be used to derive a motion vector. For example, in FIG. 26B, when blocks 2630 and 2660 located at an upper-right corner cannot be used, a sub block located at a center of an upper edge may be used. A width used to calculate such a model may need to be adjusted accordingly.

Figure 27:
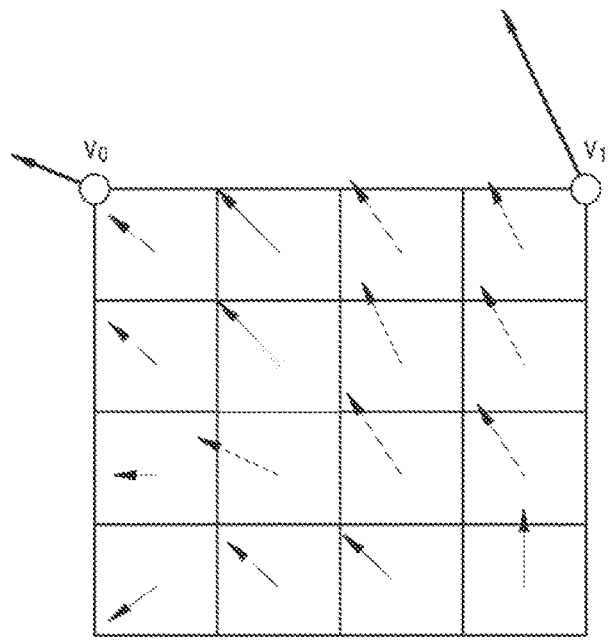
FIG. 27 is a view for describing a method of determining resolutions for three control point motion vectors (CPMVs) of an affine mode.

FIG. 27 is a view for describing a method of determining resolutions for three Control Point Motion Vectors (CPMVs) of an affine mode.

In an affine mode, two or three control point motion vectors may be used to determine motion vectors of sub blocks, and a control point motion vector may be a motion vector corresponding to a corner of a block. For example, vectors $V_0$ and $V_1$ of FIG. 27 may correspond to control point motion vectors.

When three control point motion vectors are used, information representing three resolutions may be signaled to determine resolutions of the individual control point motion vectors. For example, information, such as {1, ¼, ¼}, {¼, ¼, ¼}, or {⅛, ⅛, ⅛}, may be signaled. The resolutions may be resolutions of control point motion vectors corresponding to upper-left, upper-right, and lower-left corners. Also, the resolutions may be resolutions corresponding to other control point motion vectors.

According to an embodiment, resolutions for three control point motion vectors may be derived from neighboring blocks. More specifically, when resolutions are derivable without signaling of information or resolutions are derivable from a plurality of neighboring blocks, indexes may be transmitted.

According to an embodiment, resolutions for three control point motion vectors may be derived based on sizes of blocks. The reason may be because larger coding units may result in a greater motion vector difference required for three control point motion vectors.

According to an embodiment, an independent index representing a resolution for each corner may be transmitted to determine a resolution.

According to an embodiment, when a mode determining a resolution for each control point motion vector is applied, a set representing a resolution may be transmitted at a slice level or frame level, and, at a coding unit level, additional signaling of an index may not be required.

Figure 28:
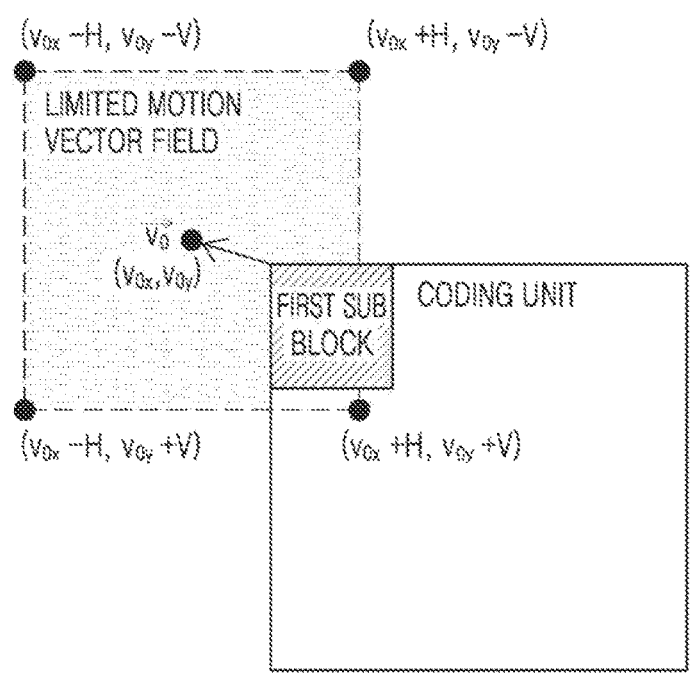
FIG. 28 is a view for describing a method of limiting a reference area for a memory bandwidth reduction in an affine mode.

FIG. 28 is a view for describing a method of limiting a reference area for a memory bandwidth reduction in an affine mode.

Referring to FIG. 28, a reference area for motion compensation for a first sub block of a current coding unit may be determined to be a limited motion vector field.

More specifically, a current coding unit may be split into sub areas. The splitting into sub areas may be determined based on a size of a current block. Also, a size of a current block, used to determine splitting into sub areas, may be fixed.

A worst bandwidth may have been determined in advance. After a worst bandwidth is known, it may be possible to calculate a size of an allowed reference area access not exceeding the worst bandwidth. After a reference area being accessible to a given sub area is known, all motion vectors for sub blocks of the sub area may be clipped such that a reference area required for motion compensation of the sub blocks does not exceed the accessible reference area.

In addition to limiting a reference area for a memory bandwidth reduction in an affine mode, size limitation may be required for prediction in an affine inheritance model. More specifically, to derive an affine inheritance model, an access to control point motion vectors of neighboring blocks may be required. Accordingly, the control point motion vectors of the neighboring blocks may need to be stored. Because a control point motion vector needs to be stored at an 8×8 block level, additional hardware cost may be required. To reduce such additional storage cost, an affine inheritance model may be used only when a neighboring block is larger than 8×8.

Also, a 4-parameter inheritance model may require two control point motion vectors, and a 6-parameter inheritance model may require three control point motion vectors. Accordingly, to derive an affine inheritance model, independent neighboring block size limitation may be applied. For example, only a 4-parameter affine inheritance model may be derived from an affine neighboring block having a size that is larger than 8×8, and only a 6-parameter affine inheritance model may be derived from an affine neighboring block having a size that is larger than 16×16. Accordingly, a motion vector buffer amount in an affine mode may be reduced.

Figure 29:
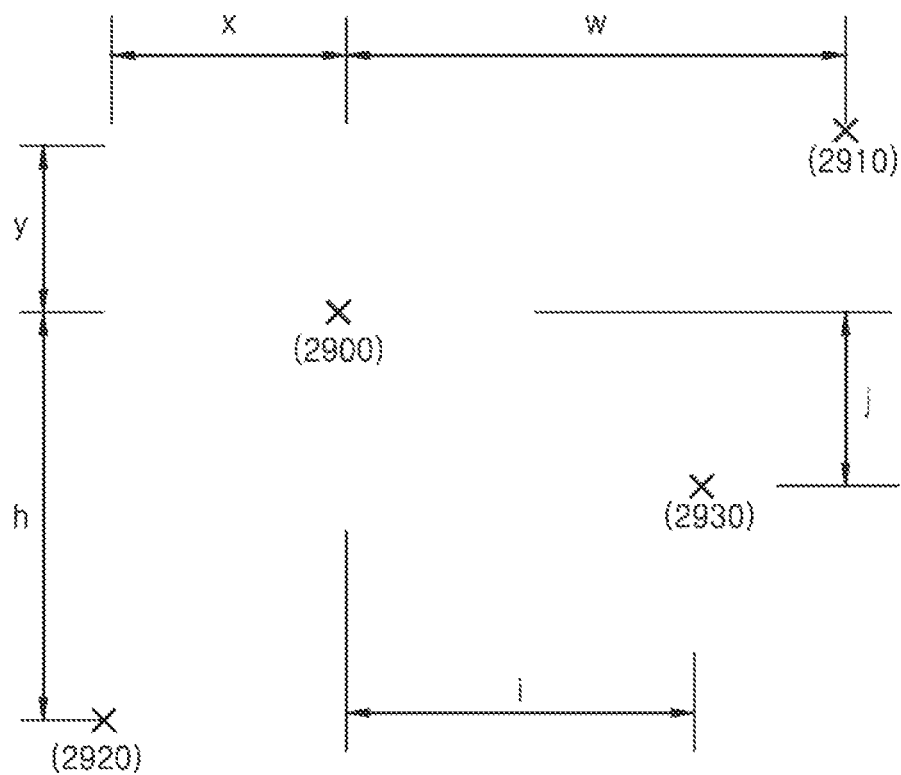
FIG. 29 describes a method of determining a motion vector determining method for a current block in an affine mode.

FIG. 29 describes a method of determining a motion vector determining method for a current block in an affine mode. Hereinafter, Equations 10 to 12 represent a method of determining a motion vector of a current block according to first, second, and third motion vector extraction positions 2900, 2902, and 2904 of FIG. 29.

In Equations 10 and 11, w represents a horizontal distance between the first motion vector extraction position 2900 and the second motion vector extraction position 2910. Also, h represents a vertical distance between the first motion vector extraction position 2900 and the third motion vector extraction position 2920. Also, x represents a horizontal distance between the first motion vector extraction position 2900 and the third motion vector extraction position 2920. Also, y represents a vertical distance between the first motion vector extraction position 2900 and the second motion vector extraction position 2910.

$P_0$ represents a first motion vector, $P_1$ represents a second motion vector, and $P_2$ represents a third motion vector. Also, dx and dy represent a horizontal change and a vertical change, respectively.

$$dx = \frac{(hP_1 - yP_2) - (hP_0 - yP_0)}{wh - xy}$$ [Equation 10]

$$dy = \frac{(xP_1 - wP_2) - (xP_0 - wP_0)}{xy - wh}$$ [Equation 11]

The horizontal change may be determined according to Equation 10, and the vertical change may be determined according to Equation 11. Also, according to Equation 12, a motion vector of a sample 2930 of the current block may be determined according to the horizontal change and the vertical change. In Equation 12, Pa represents the motion vector of the sample 2930 of the current block. Also, i represents a horizontal distance between the first motion vector extraction position 2900 and the sample 2930 of the current block, and j represents a vertical distance between the first motion vector extraction position 2900 and the sample 2930 of the current block.

$$Pa = P0 + idx + jdy$$ [Equation 12]

According to Equations 10 to 12, when three motion vectors and extraction positions of the motion vectors are given, motion vectors of samples included in a current block may be determined.

So far, various embodiments have been described. It will be apparent that those skilled in the art may readily make various modifications thereto without changing the essential features of the disclosure. Thus, it should be understood that the disclosed embodiments described above are merely for illustrative purposes and not for limitation purposes in all aspects. The scope of the disclosure is defined in the accompanying claims rather than the above detailed description, and it should be noted that all differences falling within the claims and equivalents thereof are included in the scope of the disclosure.

Meanwhile, the embodiments of the disclosure may be written as a program that is executable on a computer, and implemented on a general-purpose digital computer that operates a program using a computer-readable recording medium. The computer-readable recording medium may include a storage medium, such as a magnetic storage medium (for example, ROM, a floppy disk, a hard disk, etc.) and an optical reading medium (for example, compact disc-read only memory (CD-ROM), a digital versatile disc (DVD), etc.).

The invention claimed is:

1. A video decoding method comprising:
   obtaining an affine parameter of a current block if a prediction mode of the current block is an affine mode;
   determining motion vectors of a plurality of sub luma blocks using the affine parameter of the current block, wherein the plurality of sub luma blocks are included in the current block;
   determining a mean luma motion vector for four sub luma blocks among the plurality of sub luma blocks by using one set between a first set and a second set, wherein the four sub luma blocks including a first sub luma block, a second sub luma block, a third sub luma block, and a fourth sub luma block;
   determining the mean luma motion vector to be a motion vector of a current sub chroma block corresponding to the four sub luma blocks; and
   performing prediction on the current sub chroma block by using the determined motion vector,
   wherein the first set includes a motion vector of the first sub luma block and a motion vector of the fourth sub luma block, and excludes at least one of a motion vector of the second sub luma block and a motion vector of the third sub luma block, and
   wherein the second set includes the motion vector of the second sub luma block and the motion vector of the third sub luma block, and excludes at least one of the motion vector of the first sub luma block and the motion vector of the fourth sub luma block,
   wherein the first sub luma block is located an upper-left portion of a four neighboring sub luma blocks, the second sub luma block is located an upper-right portion of the four neighboring sub luma blocks, the third sub luma block is located an lower-left portion of the four neighboring sub luma blocks, and the fourth sub luma block is an lower-right portion of the four neighboring sub luma blocks.

2. A video encoding method comprising:
  obtaining an affine parameter of a current block if a prediction mode of the current block is an affine mode;
  determining motion vectors of a plurality of sub luma blocks using the affine parameter of the current block, wherein the plurality of sub luma blocks are included in the current block;
  determining a mean luma motion vector for four sub luma blocks among the plurality of sub luma blocks by using one set between a first set and a second set, wherein the four sub luma blocks including a first sub luma block, a second sub luma block, a third sub luma block, and a fourth sub luma block;
  determining the mean luma motion vector to be a motion vector of a current sub chroma block corresponding to the four sub luma blocks; and
  performing prediction on the current sub chroma block by using the determined motion vector,
  wherein the first set includes a motion vector of the first sub luma block and a motion vector of the fourth sub luma block, and excludes at least one of a motion vector of the second sub luma block and a motion vector of the third sub luma block, and
  wherein the second set includes the motion vector of the second sub luma block and the motion vector of the third sub luma block, and excludes at least one of the motion vector of the first sub luma block and the motion vector of the fourth sub luma block,
  wherein the first sub luma block is located an upper-left portion of a four neighboring sub luma blocks, the second sub luma block is located an upper-right portion of the four neighboring sub luma blocks, the third sub luma block is located an lower-left portion of the four neighboring sub luma blocks, and the fourth sub luma block is an lower-right portion of the four neighboring sub luma blocks.

3. A non-transitory computer-readable medium for recording a bitstream, the bitstream comprising:
  an encoded data of a current block,
  wherein the encoded data of the current block is obtained by:
    obtaining an affine parameter of the current block if a prediction mode of the current block is an affine mode;
    determining motion vectors of a plurality of sub luma blocks using the affine parameter of the current block, wherein the plurality of sub luma blocks are included in the current block;
    determining a mean luma motion vector for four sub luma blocks among the plurality of sub luma blocks by using one set between a first set and a second set, wherein the four sub luma blocks including a first sub luma block, a second sub luma block, a third sub luma block, and a fourth sub luma block;
    determining the mean luma motion vector to be a motion vector of a current sub chroma block corresponding to the four sub luma blocks; and
    performing prediction on the current sub chroma block by using the determined motion vector,
  wherein the first set includes a motion vector of the first sub luma block and a motion vector of the fourth sub luma block, and excludes at least one of a motion vector of the second sub luma block and a motion vector of the third sub luma block, and
  wherein the second set includes the motion vector of the second sub luma block and the motion vector of the third sub luma block, and excludes at least one of the motion vector of the first sub luma block and the motion vector of the fourth sub luma block,
  wherein the first sub luma block is located an upper-left portion of a four neighboring sub luma blocks, the second sub luma block is located an upper-right portion of the four neighboring sub luma blocks, the third sub luma block is located an lower-left portion of the four neighboring sub luma blocks, and the fourth sub luma block is an lower-right portion of the four neighboring sub luma blocks.

* * * * *